(12) United States Patent
Liao

(10) Patent No.: US 11,402,056 B2
(45) Date of Patent: Aug. 2, 2022

(54) FRAME ASSEMBLY FOR STABILIZER, AND STABILIZER

(71) Applicant: GUILIN ZHISHEN INFORMATION TECHNOLOGY CO., LTD., Guilin (CN)

(72) Inventor: Yilun Liao, Guangxi (CN)

(73) Assignee: GUILIN ZHISHEN INFORMATION TECHNOLOGY CO., LTD., Guangxi (CN)

( * ) Notice: Subject to any disclaimer, the term of this patent is extended or adjusted under 35 U.S.C. 154(b) by 0 days.

(21) Appl. No.: 17/047,933

(22) PCT Filed: Sep. 3, 2019

(86) PCT No.: PCT/CN2019/104151
§ 371 (c)(1),
(2) Date: Oct. 15, 2020

(87) PCT Pub. No.: WO2020/011278
PCT Pub. Date: Jan. 16, 2020

(65) Prior Publication Data
US 2021/0156509 A1 May 27, 2021

(30) Foreign Application Priority Data
Jul. 13, 2018 (CN) .......................... 201810780332.4

(51) Int. Cl.
*F16M 13/04* (2006.01)
*F16M 11/18* (2006.01)
(Continued)

(52) U.S. Cl.
CPC ............ *F16M 11/18* (2013.01); *F16M 13/04* (2013.01); *F16M 11/123* (2013.01); *F16M 2200/041* (2013.01); *G03B 17/561* (2013.01)

(58) Field of Classification Search
CPC ........ F16M 11/00; F16M 11/02; F16M 11/04; F16M 11/041; F16M 11/06; F16M 11/12;
(Continued)

(56) References Cited

U.S. PATENT DOCUMENTS 5,243,370 A 9/1993 Slater
9,039,307 B2 5/2015 Lecuna Aguerrevere
2017/0301230 A1* 10/2017 Liu ...................... G03B 17/563

FOREIGN PATENT DOCUMENTS

CN 205350746 U 6/2016
CN 107278246 A 10/2017
(Continued)

OTHER PUBLICATIONS

International Search Report for PCT/CN2019/104151 dated Dec. 4, 2019.
(Continued)

*Primary Examiner* — Clayton E. LaBalle
*Assistant Examiner* — Fang-Chi Chang
(74) *Attorney, Agent, or Firm* — Rimon PC; Zhun Lu

(57) ABSTRACT

Present invention provides a frame assembly for a stabilizer, wherein the stabilizer comprises a gimbal for fixing a photographing device and adjusting the posture of the photographing device, the frame assembly is used for supporting the gimbal, and comprises: a first frame part; a second frame part configured to be disposed at an angle with the first frame part; and a holding handle; wherein the frame assembly is configured to allow the stabilizer to be held via the holding handle in a manner roughly vertically aligned with the overall center of gravity of the stabilizer and a photographing device. Therefore, present invention provides the stabilizer and the frame assembly thereof, which is ergonomic, good in stability and changeable in operation pos-
(Continued)

tures. Furthermore, present invention also provides a stabilizer with the frame assembly.

14 Claims, 11 Drawing Sheets

(51) Int. Cl.
*F16M 11/12* (2006.01)
*G03B 17/56* (2021.01)

(58) Field of Classification Search
CPC .. F16M 11/121; F16M 11/123; F16M 11/125; F16M 11/126; F16M 11/128; F16M 11/14; F16M 11/16; F16M 11/18; F16M 11/20; F16M 11/2007; F16M 11/2014; F16M 11/2021; F16M 11/2028; F16M 11/2035; F16M 11/2042; F16M 11/205; F16M 11/2057; F16M 11/2064; F16M 11/2071; F16M 11/2078; F16M 13/00; F16M 13/02; F16M 13/022; F16M 13/04; F16M 2200/00; F16M 2200/02; F16M 2200/021; F16M 2200/022; F16M 2200/024; F16M 2200/041; G03B 17/56; G03B 17/561; G03B 17/563; G03B 17/566

See application file for complete search history.

(56) References Cited

FOREIGN PATENT DOCUMENTS

| | | | |
|---|---|---|---|
| CN | 207200802 U | | 4/2018 |
| CN | 108006416 A | | 5/2018 |
| KR | 20100107713 A | * | 10/2010 |
| WO | WO-2017132813 A1 | * | 8/2017 ............. F16M 11/16 |

OTHER PUBLICATIONS

Written Opinion of the International Searching Authority for PCT/CN2019/104151 dated Dec. 4, 2019.

* cited by examiner

FRAME ASSEMBLY FOR STABILIZER, AND STABILIZER

CROSS-REFERENCE TO RELATED APPLICATIONS

This application is a national stage application (under 35 U.S.C. § 371) of PCT/CN2019/104151, filed Sep. 3, 2019, which claims benefit of Chinese Application No. 201810780332.4, filed Jul. 13, 2018, both of which are incorporated herein by reference in their entirety.

TECHNICAL FIELD

The present invention relates to the technical field of stabilizers, in particular to a frame assembly which is used for holding a stabilizer provided with a photographing device in a labor-saving manner and has high space utilization rate. The present invention also relates to a stabilizer with the frame assembly.

BACKGROUND ART

It is known that existing hand-held stabilizers generally consist of a gimbal for fixing the photographing device and a frame assembly connected at one end to the gimbal for supporting the gimbal, wherein the frame is generally in the form of a vertical straight rod structure which can be gripped by a photographer for lifting the photographing portion during photographing. Since the operation keys of the hand-held stabilizer and the battery required for the operation of the hand-held stabilizer are both disposed in the frame, this tends to make the frame long. The frame with the elongated rod structure has the following problems: when the hand-held stabilizer is loaded with the camera, at least 60% of the total weight of the stabilizer and the camera may be concentrated in the camera position due to the heavy load of the camera, i.e., the overall center of gravity of the camera and the stabilizer may be a distance higher than the part where the user grips the hand-held stabilizer. The distance enables a user to spend a great deal of effort in order to balance the weight of the camera, bringing the wrist or the arm of the user an uncomfortable pressing sense; particularly photographing by using the lifting mode for a long time can be very laborious, which requires high arm strength for a photographer, and does not meet the great trend of improving the ergonomic friendliness and the user experience nowadays.

As an improvement, it has been proposed to support the gimbal via a cross bar with handles at both ends in order to use both hands to share the weight of the overall stabilizer and camera to reduce the arm strength requirement for the photographer. In practice, however, the two handles disposed on the cross bar enable the hands to be far away from the stabilizer and the camera, so that the photographer is required to open the two arms to achieve gripping, disable to achieve the desires of reducing the photographer's arm strength requirement and saving labor.

Meanwhile, due to the fact that the overall center of gravity of the hand-held stabilizer with the camera is mainly concentrated on the upper part close to the camera, the overall center of gravity is far away from the grip portion held by the user, easily causing shaking of the gimbal. If the distance between the overall center of gravity of the hand-held stabilizer and the camera and the user's grip portion is reduced, the area of the function area for operating the key and the size of the battery compartment for accommodating the battery are reduced, which is disadvantageous for the function improvement and the operation time improvement of the hand-held stabilizer.

Therefore, there remains a need in the field to provide a stabilizer and Frame assembly thereof, which is ergonomic, good in stability and changeable in operation postures.

SUMMARY OF THE INVENTION

The present invention is directed to a frame assembly and a stabilizer with the frame assembly that at least partially addresses the deficiencies of the prior art described above.

According to an aspect of the present invention, provided is a frame assembly of a stabilizer, wherein the stabilizer comprises a gimbal for fixing a photographing device and adjusting an posture of the photographing device, the frame assembly is used for supporting the gimbal; wherein the frame assembly comprises: a first frame part having a first end connected to the gimbal and a second end far away from the gimbal, the first frame part being configured to support the gimbal with its first end; a second frame part having a first end connected to the first frame part and a second end far away from the first frame part, the second frame part being configured to be disposed at an angle with the first frame part; a holding handle configured with a connection end connected to the second end of the second frame part and a holding end far away from the second frame part such that the frame assembly is configured to allow the stabilizer to be held via the holding handle in a manner substantially vertically aligned with the overall center of gravity of the stabilizer and a photographing device.

Thus, the frame assembly according to the present invention, compared with the prior art, changes the design of the frame assembly of the conventional stabilizer from the fundamental functional principle, and modifies the conventional single straight-rod frame into a frame assembly consisting of a plurality of parts extending in different directions. At least the following beneficial effects can be achieved through the modification: 1. it overcomes the discomfort caused by the misalignment of the position where the user grips the straight rod and the overall center of gravity of the stabilizer and the photographing device when holding the existing single straight rod frame, and the frame assembly including a plurality of parts extending in different orientations of the present invention, allows the user to hold the stabilizer in a manner aligned with the overall center of gravity, which can greatly reduce the wrist or arm effort required for the user to hold the stabilizer (especially in the case of long-term holding), thereby increasing the user's sense of experience; 2. the single straight rod structure is eliminated by the frame assembly of the present invention, which allows the user to adjust the shape of the frame assembly according to the actual photographing position, thereby ensuring that the frame assembly is ergonomics in various environments; and 3. via the frame assembly of the present invention, the electrical components and control keys required for the operation of the stabilizer can be disposed in sections on each component of the frame assembly without reducing performance of the stability of the stabilizer, which advantageously improves the space utilization of the overall stabilizer, making the key layout more beautiful and clear, easy to operate and not easy to be confused.

In a preferred embodiment, the gimbal is a three-axis gimbal having a yaw axis, wherein the first frame part extends generally in the direction of the yaw axis and the second frame part extends roughly perpendicular to the yaw axis. Therefore, the frame assembly can be disposed in a compact structure and reasonable layout mode.

In a preferred embodiment, the first frame part and the second frame part are constructed as one piece. Thereby, the production and assembly of the frame assembly can be achieved in a simple manner.

In a preferred embodiment, wherein the holding handle is pivotally connected to the second end of the second frame part about an axis of the second frame part via a first pivot mechanism disposed between the holding handle and the second frame part such that an angle of the holding handle relative to the first frame part is adjustable. Thereby, adjustment of the operation postures of the frame assembly is achieved in a simple and reliable manner.

In a preferred embodiment, the first pivot mechanism comprises: a pivot shaft fixedly connected to the second frame part; and a pivot mount, one end of which is rotatably supported on the pivot shaft to pivot relative to the second frame part about the axis of the second frame part, and the opposite end of which is connected to the holding handle. Therefore, the adjustment of the operation postures of the frame assembly is realized in a manner of saving the number of parts, and meanwhile, the pivot shaft can be concealed within the pivot mount, improving the attractiveness and the texture of the stabilizer.

In a preferred embodiment, the first pivot mechanism also comprises a first limiting mechanism configured to define a pivot angle range of the pivot mount relative to the second frame part about the axis of the second frame part and comprising: a limiting groove disposed on the pivot mount and extending along the circumferential direction of the pivot shaft; a stopper fixedly connected to an end portion of the pivot shaft, the stopper having a stopping protrusion extending into the limiting groove. Thereby, the pivot angle range of the holding handle relative to the second frame part is defined in a simple and reliable manner.

In a preferred embodiment, the first pivot mechanism also comprises a first locking mechanism configured to lock the pivot mount in a predetermined angular position relative to the second frame part and comprising: a clamping block disposed about the pivot shaft and capable of acting between a clamped position and a released position, and when the clamping block is in the clamped position, the clamping block prevents the pivot mount from rotating relative to the second frame part about the pivot shaft via frictional engagement and/or positive fit between the clamping block and the pivot shaft; and a threaded member configured to actuate the clamping block to act between the clamped position and the released position via its own rotation. Thereby, the setting and locking of the angle formed by the holding handle and the second frame part is achieved in a simple and reliable manner.

In a preferred embodiment, the holding handle is pivotally connected to the second end of the second frame part about a pivot axis orthogonal to the axis of the second frame part via a second pivot mechanism disposed between the holding handle and the second frame part such that an angle of the holding handle relative to the second frame part is adjustable. Thereby, the user is allowed to hold the stabilizer ergonomically in a simple and reliable manner.

In a preferred mode, the second pivot mechanism comprises: a pivot mount, one end of which is connected to the second frame part, and the other end of which is provided with a pair of connecting arms, and an interior space being defined between the pair of connecting arms; a pivot body fixedly connected to the holding handle, the pivot body being configured to be sandwiched in the interior space between the pair of connecting arms such that the holding handle is pivotable about the pivot axis relative to the pivot mount. Therefore, the adjustment of the frame assembly is realized in a manner of saving the number of parts, and meanwhile the pivot body can be concealed within the pivot mount, improving the attractiveness and the texture of the stabilizer.

In a preferred mode, the second pivot mechanism also comprises a second limiting mechanism configured to define the pivot angle range of the holding handle relative to the second frame part and comprising: a limiting groove defined at least in part by the pivot body, the limiting groove being configured to rotate with the holding handle and define an angle range at which the holding handle is pivotable; and a stopper fixedly disposed on the pivot mount and extending into the limiting groove to prevent the holding handle from rotating beyond the angle range via the stopper. Thereby, the pivot angle range of the holding handle relative to the second frame part is defined in a simple and reliable manner.

In a preferred mode, the second pivot mechanism also comprises a second locking mechanism configured to lock the holding handle in a predetermined angular position relative to the second frame part and comprising: a locking member configured to act between a pressed position and a released position in the direction of the pivot axis, wherein the locking member is configured to lock the holding handle at a predetermined angular position relative to the second frame part in frictional engagement and/or positive fit when in the pressed position; and an adjustment member configured to actuate the locking member to act between the pressed position and the released position via its own rotation. Thereby, setting and locking of the angle formed by the second frame part and the holding handle is achieved in a simple and reliable manner.

In a preferred mode, wherein the pivot body is a ball joint, and the locking member comprises a pair of clamping mounts respectively disposed at both sides of the ball joint in the direction of the pivot axis, wherein the pair of clamping mounts are provided with a spherical concave surface conformed to an outer spherical surface of the ball joint to stop the ball joint in frictional engagement and/or positive fit when the clamping mounts are pressed. Thereby, the pivot angle range of the holding handle relative to the second frame part is defined in a more robust and reliable manner.

In a preferred mode, the pivot body is a pivot shaft, and the locking member comprises a locking block located at one side of the pivot shaft in the direction of the pivot axis, the locking block being conformed to a recess disposed at an end side of the pivot shaft to stop the pivot shaft in frictional engagement and/or a positive fit when the locking block is pressed. Thereby, the pivot angle range of the holding handle relative to the second frame part is defined in a simple and reliable manner.

In a preferred mode, the second locking mechanism also comprises: a guide sleeve fixedly connected to the pivot mount; a wedge block slidable within the guide sleeve, the wedge block being arranged between the adjustment member and the locking member and configured to wedge the locking member in its pressed position in a wedge surface fit with the locking member when being pressed. As a result, the locking of the second frame part at a predetermined angular position relative to the holding handle is achieved in a more robust and reliable manner due to the wedge surface engaging pression to prevent rebound.

In a preferred mode, the second pivot mechanism is configured as an index locking mechanism configured to be connected at one end thereof to the second end of the second frame part, the index locking mechanism is also provided with an adjustment member for actuating the index locking mechanism to act between an engaged position and a disengaged position, when being in the disengaged position, the index locking mechanism can rotate relative to the second frame part in an index adjustment manner, so that the angle formed by the holding handle relative to the second frame part can be adjusted in an index adjustment manner. Thereby, an angular adjustment between the second frame part and the holding handle can be achieved, so that the stabilizer can be operated ergonomically.

In a preferred mode, the index locking mechanism comprises a generally hook-shaped locking member having a hook portion at one end; the hook portion of the locking member is sized for the holding handle to be passed in such a manner that the insertion depth is adjustable, an end of the locking member far away from the hook portion is configured with a second end face fluted disc meshed with a first end face fluted disc at the second end of the second frame part, and the angle of the holding handle relative to the second frame part is adjusted in an index adjustment manner through meshing of the first end face fluted disc and the second end face fluted disc. Thereby, the adjustment of the angle between the second frame part and the holding handle can be achieved in a simple and reliable manner.

In a preferred mode, a through-hole is provided at the second end of the second frame part through which the holding handle passes, and the holding handle is accommodated in the through-hole in such a manner that its insertion depth in the through-hole is adjustable. Thereby, adjustability of the insertion depth of the holding handle relative to the second frame part is achieved in a simple and reliable manner.

In a preferred embodiment, the second frame part is pivotally connected to the first frame part about its own axis relative to the first frame part. Thereby, adjustment of the operation postures of the Frame assembly is achieved in a simple and reliable manner.

In a preferred embodiment, the first frame part is provided at its second end with a screw hole for connecting the external accessory, or the holding handle is provided at its connecting end or holding end with a screw hole for connecting the external accessory. Thereby, it is possible to allow a user to connect the external accessory such as a tripod, flashlight and the like to the Frame assembly as required in a simple manner, thereby expanding the use range of the gimbal.

In another aspect, the present invention also provides a stabilizer comprising a gimbal with a yaw axis for fixing a photographing device and a Frame assembly for supporting the gimbal, wherein the Frame assembly is the Frame assembly according to the present invention.

Part of additional features and advantages of the present invention will be apparent to those skilled in the art after reading this disclosure, and the other part will be described in the following specific embodiments in conjunction with the accompanying drawings.

BRIEF DESCRIPTION OF THE DRAWINGS

Hereinafter, examples of the present invention will be described in detail with reference to the accompanying drawings, in which.

DESCRIPTION OF THE REFERENCES

Figure 1:
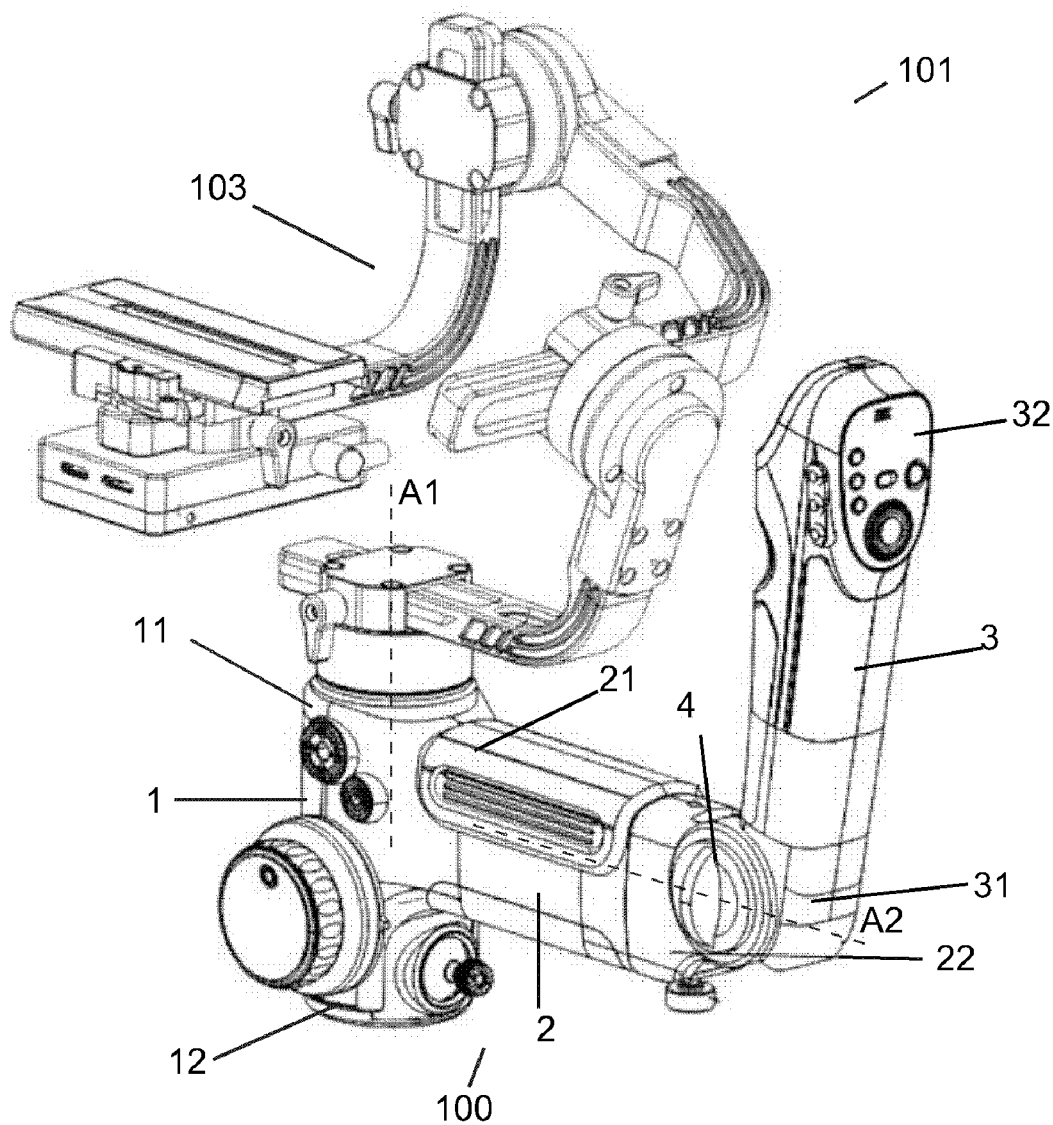
FIG. 1 shows a perspective view of a stabilizer with a first embodiment of the frame assembly of the present application.

100. Frame assembly 101. stabilizer 102. photographing device 103. gimbal
1. first frame part 11. first end 12. second end 2. second frame part
21. first end 22. second end 23. first end face fluted disc 3. holding handle
31. connecting end 32. holding end 41, 41'. pivot mounts 42, 42'. connecting arms
421, 421'. interior spaces 43, 43'. support pins 51, 51'. pivot shafts
52, 52'. stoppers 521, 521'. stopping protrusions 53, 53'. clamping blocks
54, 54'. threaded members 55, 55'. connecting plates 61, 61'. pivot body
611, 611'. limiting groove 612. recess 62. locking blocks 621, 622. clamping mount
63, 63'. adjustment member 64. guide sleeve 65. wedge block 7. index locking mechanism
71. second end face fluted disc 72. hook 73. adjustment member 74. adjustment screw
8. external accessory A1. yaw axis A2. axis of second frame A3. pivot axis
A4. overall center of gravity line of stabilizer and photographing device

DETAILED DESCRIPTION OF THE INVENTION

An illustrative version of the disclosed Frame assembly will now be described in detail with reference to the accompanying drawings. While the drawings are provided to present some embodiments of the present invention, the drawings are not necessarily drawn to scale in particular embodiments, and certain features may be exaggerated, removed, or partially broken away to better illustrate and explain the present disclosure. Some of the components in the drawings can be adjusted according to actual requirements without affecting technical effects. The phrase "in the drawings" or similar expression appearing in the specification does not necessarily refer to all drawings or examples.

It should be noted that when an element is referred to as being "fixed" to another element, it can be directly on another element or an intervening element may also be present. When an element is referred to as being "connected" to another element, it can be directly connected to another element or an intervening element may be present. When an element is referred to as being "disposed" on another element, it can be directly disposed on another element or an intervening element may be present. Hereinafter, some directional terms used to describe the drawings, such as "horizontal", "vertical", "front", "rear", "inner", "outer", "above", "below" and other directional terms will be understood to have their normal meaning and refer to those directions involved in normal viewing of the drawings. Unless otherwise indicated, directional terms described herein substantially follow conventional directions as understood by those skilled in the art.

The terms "first", "second" and similar terms used in the present invention do not denote any order, quantity or importance in the present invention, but are used to distinguish one component from other components. Where the term "substantially" should be understood as not requiring strict collinear or coaxial, but allows the arrangement within a reasonable deviation range. The term "substantially perpendicular" should be understood as not requiring to be strictly 90 degrees perpendicular, but allowing an angular deviation preferably within the range of plus or minus 5 degrees. The term "overall center of gravity" refers to the center of gravity obtained when a plurality of individual components connected to each other are regarded as a whole. The term "substantially vertically aligned" should be understood as being aligned with the object to be aligned in the vertical direction or the deviation between the two is within an acceptable range, for example, the deviation is not more than 2 cm.

Further, the term "ball joint" used in the present invention refers to a joint member capable of at least partially forming spherical contact with the adapter member, wherein the spherical contact should not be understood as being limited to spherical contact in the absolute geometric sense, and it should be understood as allowing a certain deformation or deviation within the manufacturing tolerance range. Similarly, the term "spherical" should not be understood as being limited to sphericity in an absolute geometric sense, but should be understood as allowing a certain deformation or deviation within the manufacturing tolerance range. Nor should the term "orthogonal" mean that there is a vertical relationship in the three-dimensional space, A orthogonal to B means that there is a vertical relationship between A and B, regardless of whether A and B are coplanar.

Hereinafter, some embodiments of the present invention will be described in detail with reference to the accompanying drawings. Without conflict, the examples described below and features in the examples may be combined with one another.

Figure 2:
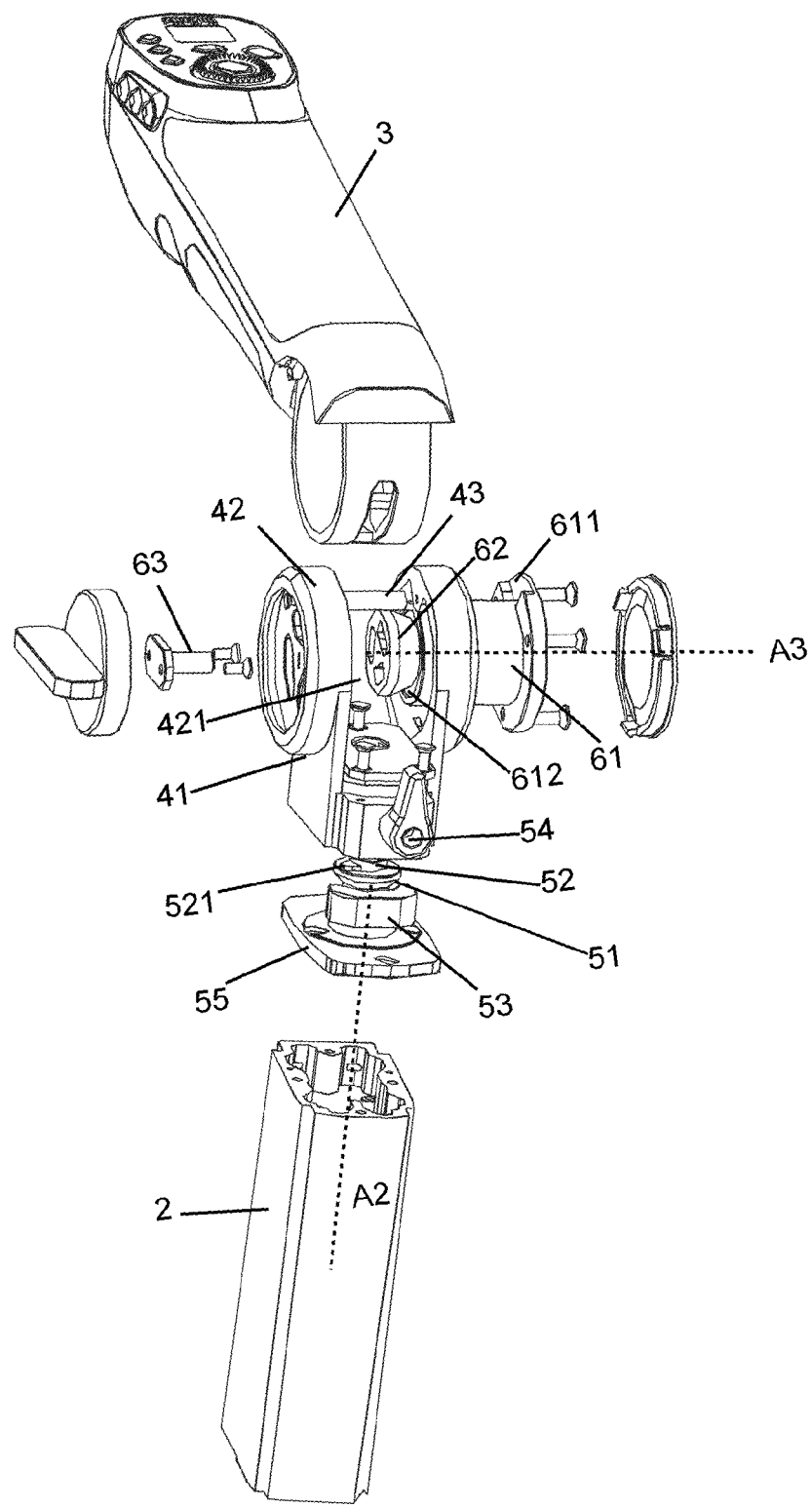
FIGS. 2-3 show perspective views of two examples of a pivot mechanism of the frame assembly of the present application, respectively.
Figure 3:
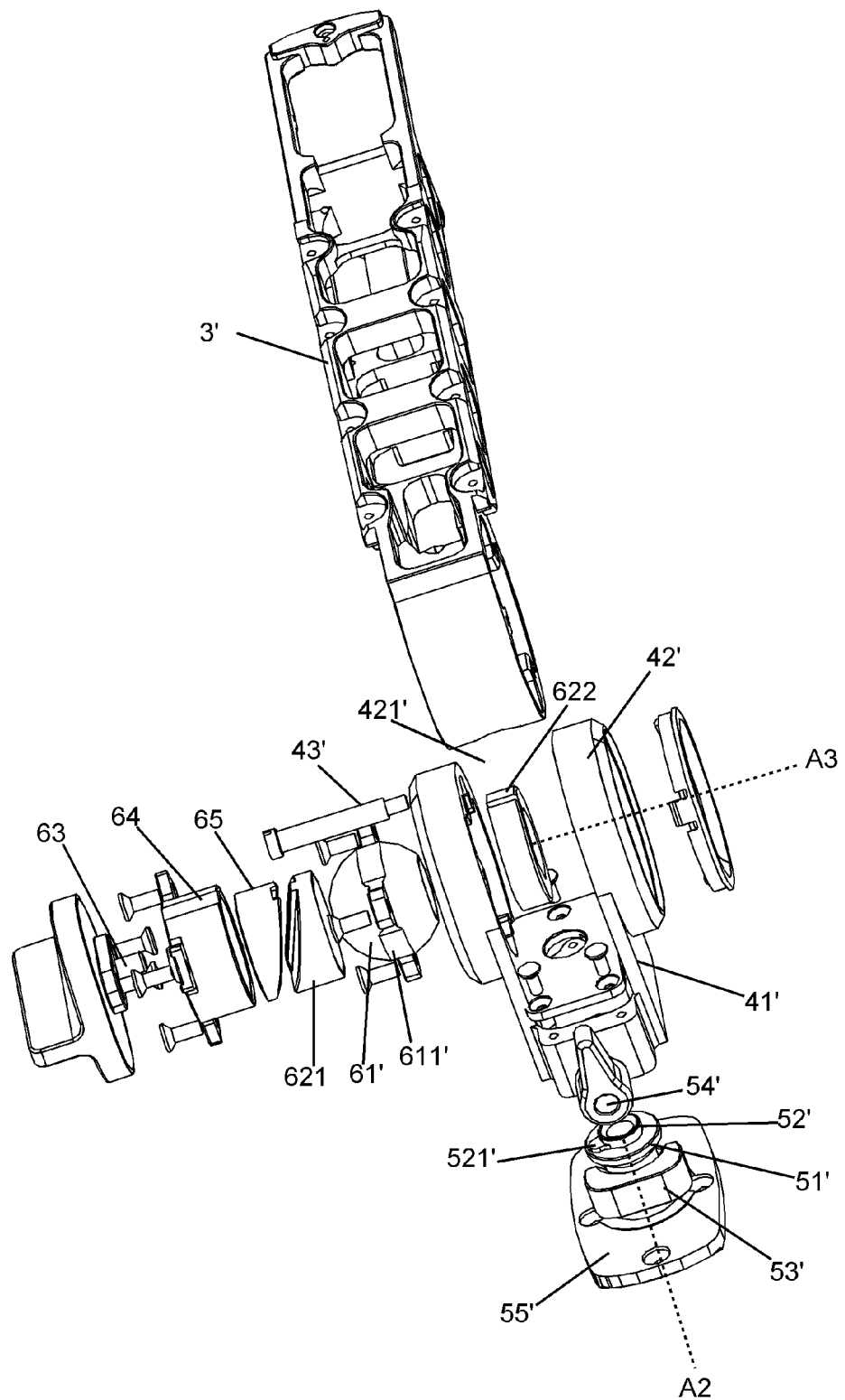

Referring to FIGS. 1-3, a stabilizer 101 with a first embodiment of a frame assembly 100 of the present invention is shown. The stabilizer 101 comprises a gimbal 103 for fixing a photographing device such as a single lens reflex camera or a video camera or VR device. As shown in FIG. 1, the gimbal 103 is a three-axis gimbal and comprises a three-rotating axis structure, namely a pitch axis structure, a roll axis structure and a yaw axis structure. The pitch axis structure can be used for mounting the photographing device, and as an example, a motor in the pitch axis structure can drive the photographing device to perform pitch motion around the pitch axis; the pitch axis structure is arranged on the roll axis structure, and a motor in the roll axis structure drives the photographing device to perform roll motion around the roll axis; the roll axis structure is arranged on the yaw axis structure, and a motor in the yaw axis structure controls the camera of the photographing device to rotate around the yaw axis A1. It should be noted that although a three-axis gimbal is shown in the drawing, the solution provided in embodiments of the present invention is equally applicable to a dual-axis gimbal.

As further shown in FIG. 1, the stabilizer 101 also comprises a frame assembly 100 for supporting the gimbal 103. The Frame assembly comprises: a first frame part 1 extending in the direction of the yaw axis A1 of the gimbal 103, the first frame part 1 is, by way of example, generally cylindrical having a first end 11 connected to the gimbal 103 and a second end 12 far away from the gimbal 103. The first frame part 1 supports the gimbal 103 with its first end 11, in particular the first end 11 of the first frame part 1 is connected to the yaw axis structure of the gimbal 103 so as to overallly support the gimbal 103. Further preferably, the first frame part 1 is provided at its second end 12 with a threaded hole for connecting with an external accessory, such as, but not limited to, a tripod, flashlight, or other fitting. Wherein the screw hole can be a general screw hole of ¼. Thereby, it is possible to allow a user to connect the external accessory such as a tripod, flashlight and the like to the Frame assembly as required in a simple manner, thereby expanding the use range of the stabilizer.

As shown in FIG. 1, the vertical height of the first frame part 1 of the frame assembly 100 according to the present invention is significantly reduced compared to the prior art, and as an example, the height of the first frame part 1 may be generally about one-third to one-half of the frame height of the conventional stabilizer. Preferably, the first frame part 1 uses a part of the outer peripheral surface thereof as a layout area for arranging the function keys of the stabilizer 101, preferably the function keys comprise at least the control keys of the photographing device. For example, an interface (by way of example, a USB interface or a charging interface or an SD card interface, etc.) by which the stabilizer is used for electrical connection with an external device, and operation keys (by way of example, such as control keys of the photographing device) of the stabilizer may be concentrically arranged on the left-most outer peripheral surface (hidden from view in FIG. 1, not shown) of the first frame part 1. According to the arrangement, on one hand, when the stabilizer is operated by a user, the control key of the photographing device can be operated by idle finger(s) when the stabilizer is held, so that the photographing of the photographing device can be controlled, which improves the user experience when the user uses the stabilizer. On the other hand, when the stabilizer is in wired electrical connection with the external device, such as a charging operation or a data connection with the external device, the external lead does not interfere with the normal operation of the stabilizer by the user, which also improves the user experience when the user uses the stabilizer.

Further, an operating knob protruding from the outer peripheral surface is disposed on one side of the first frame part 1, as shown in FIG. 1. Preferably, the operating knob is arranged adjacent to the operating key so as to allow a user to operate the operating knob also with idle finger(s) while holding the stabilizer. Those skilled in the art can understand that in this way, the user experience of the user can be effectively improved.

It will be understood that the first frame part 1 is made of engineering plastic or metal having a certain strength. In order to facilitate the user's grip, the outer peripheral surface of the first frame part 1 may be frosted, for example, to prevent the first frame part 1 from accidentally slipping off the user's hand.

As shown in FIG. 1, the Frame assembly 100 also comprises a second frame part 2 extending in a direction perpendicular to the yaw axis A1 of the gimbal 103. The second frame part 2 has a first end 21 connected to the first frame part 1 and a second end 22 far away from the first frame part 1, wherein the second frame part 2 supports the first frame part 1 at its first end 21. As shown in FIG. 1, as a preferred example, the first frame part 2 and the first frame part 1 may be constructed as one piece, which is manufactured by molding, for example, when the first frame part 1 and the second frame part 2 are made of plastic. As will be understood by those skilled in the art, when the first frame part 1 and the second frame part 2 are formed in one piece, it is possible to reduce the number of parts when manufacturing the stabilizer or the Frame assembly and accordingly reduce the assembly cost. Of course, it will be understood by those skilled in the art that the first frame part 1 and the second frame part 2 may also be separate components connected to each other, in which case the second frame part 2 may be allowed to be connected to the first frame part 1 in such a way as to pivot about its own axial direction relative to the first frame part 1.

As an example, the second frame part 2 is of a cylindrical structure with an axis A2, with the section being a generally rectangle rounded at both ends. Preferably, the second frame part 2 is of an axisymmetric cylindrical structure with respect to its own axis A2. The width of the second frame part 2 is substantially the same as the diameter of the first frame part 1 to allow be connected to the first frame part 1 in a substantially smooth transition manner, which avoids a protruding or a step portion on the outer surface of the Frame assembly 100, so that the Frame assembly 100 has a good grip feel or product texture. Preferably, the second frame part 2 is provided at both the upper end face and the lower end face of the cylindrical structure thereof with soft rubber for increasing the frictional force with the hand face of the user when being held by the user. As an alternative, it is also possible to form a friction-increasing texture on the outer peripheral surface of the second frame part 2.

As a non-limiting example, the second frame part 2 is configured as a battery compartment of the stabilizer 101 for accommodating the battery. The battery compartment may be designed to allow a user to open from the outside to perform a replacement operation on the battery, or may be designed to prohibit the user from opening and perform a charging operation on the accommodated battery only through the charging interface. Of course, it will be appreciated by those skilled in the art that the second frame part may be configured for other uses such as the arrangement of function keys. It will be appreciated that the second frame part 1 may be made of the same material as the first frame part 2, such as but not limited to plastic or metal.

As shown in FIG. 1, the Frame assembly 100 also comprises a holding handle 3 disposed at an angle relative to the second frame part 2, wherein the holding handle 3 has a connecting end 31 connected to the second frame part 2 and a holding end 32 far away from the second frame part 2, shown in FIG. 1 as being above the connecting end 31. This allows the frame assembly to be configured to allow the stabilizer to be supported by the holding handle 3 in a manner substantially vertically aligned with the overall center of gravity of the stabilizer and of a photographing device (described in more detail below in connection with FIG. 6). Specifically, as shown in FIG. 1, the holding handle 3 may be configured as a generally circular cross-sectional cylindrical structure extending upward from the connecting end 31. A cambered surface conforming to the shape of the user's hand surface is preferably disposed at the holding end 32 of the holding handle 3 to increase the contact surface between the holding handle 3 and the user's hand surface. Further preferably, at the holding end 32 along the outer periphery surface thereof, provided is at least one operating member of the stabilizer 101, which may be, for example, a key, a dial, a toggle switch, or the like. With this arrangement, the user is allowed to operate the operating member of the stabilizer 101 with an idle finger while holding the stabilizer at the holding end 32, thereby improving the user experience. It can be understood by those skilled in the art that, by arranging the operation keys of the stabilizer 101 at the holding ends 32 of the first frame part 1 and the holding handle 3, respectively, not only is the user experience improved, but also it can be ensured that there is still sufficient area for arranging the operation keys of the stabilizer 101 in the case where the height of the first frame part 1 is reduced relative to the prior art. This is useful to resolve the conflict between the rich functionality of the stabilizer and the limited key layout interface. Compared with the prior art, according to the arrangement, the problem that the existing structure in the prior art is difficult to meet the requirement of continuous expansion of the gimbal function is solved, and a single frame structure limits the arrangement of new function keys in a limited function area is solved. The difference lies in that, the above arrangement makes full uses of the multi-sectional type frame assembly, improving the space utilization rate of the stabilizer, meanwhile, the control key area for the gimbal and the control key area for the camera are separated, so that the key layout is more attractive and clear, convenient to operate, and avoiding confusion.

Preferably, the holding handle 3 may be provided with a threaded hole at its connecting end 31 or holding end 32 for connecting with an external accessory 8 (shown in FIG. 6), such as, but not limited to, a tripod, flashlight or other fitting.

As further shown in FIG. 1, the holding handle 3 according to the present invention may be pivotally connected to the second end 22 of the second frame part 2 about the axis A2 of the second frame part 2 via a first pivot mechanism disposed between the holding handle 3 and the second frame part 2, thereby allowing a user to adjust the angle of the holding handle 3 relative to the first frame part 1. This, in turn, allows the user to flexibly adjust the form of the Frame assembly according to the actual application environment to ensure that the stabilizer is ergonomically operated (variations on the form of the Frame assembly will be described in detail below in connection with FIGS. 7-10). In particular, the holding handle 3 can be pivoted about the axis A2 of the second frame part 2, allowing to change the orientation of the holding handle 3 relative to the first frame part 1, for example the holding handle 3 in FIG. 1 can be pivoted 90 degrees clockwise about the axis A2. The holding handle 3 will now be in a position substantially perpendicular to the first frame part 1 (also substantially perpendicular to the plane defined by the axis A1 and the axis A2), at which time the user is allowed, for example, to rest the holding handle on a support or his shoulder, thereby relieving the burden on the user (see FIG. 10 and the description below relative to FIG. 10); further, when the holding handle 3 in FIG. 1 continues to pivot 90 degrees clockwise about the axis A2, the holding handle 3 will now be roughly in a position parallel to the first frame part 1 (roughly coplanar with the plane defined by the axis A1 and the axis A2), at which time the user is allowed to rest the second frame part 2 on the shoulder, and abut against the holding handle 3 with his back to prevent the stabilizer 101 from slipping off or deviating from his body (see FIG. 11 and the description below relative to FIG. 11). Preferably, it is desirable to set the pivot angle range of the holding handle 3 about the axis A2 to be between 0 and 180 degrees.

Further, as shown in FIG. 1, independently of the above-mentioned pivoting about the axis A2, the holding handle 3 can also be pivotally connected to the second end 22 of the second frame part 2 pivoted about a pivot axis orthogonal to the axis A2 of the second frame part (see FIGS. 2-3, pivot axis A3) via a second pivot mechanism disposed between the holding handle 3 and the second frame part 2, such that the angle of the holding handle 3 relative to the second frame part 2 is adjustable. Due to this angular adjustability, the user is allowed to adjust the angle and manner in which the user holds the stabilizer frame according to the weight of the mounted photographing device and the actual application environment to ensure that the stabilizer is ergonomically operated.

It will be appreciated by those skilled in the art that the first and second pivot mechanisms mentioned hereinabove may be constructed as separate components from each other, and it is also feasible to integrate the first and second pivot mechanisms together to reduce the number of parts of the stabilizer Frame assembly. Hereinafter, two examples of integrating the first pivot mechanism and the second pivot mechanism together will be given with reference to FIGS. 2-3. It should be noted, however, that the above-mentioned examples are not intended to limit the scope of the present application, and that those skilled in the art can make many conventional modifications without departing from the inventive concept as set forth in FIGS. 2 and 3, which still fall within the scope of the present application.

FIG. 2 shows a first exemplary mode of integrating a first pivot mechanism and a second pivot mechanism together. The pivot mechanism shown in FIG. 2 comprises: a connecting plate 55 fixedly connected to the second frame part 2, wherein the connecting plate 55 is provided with a plurality of through holes through which fasteners pass, so that the connecting plate is fixedly connected to the second frame part 2 through the fasteners disposed in the holes; and a pivot shaft 51 fixedly connected to the connecting plate 55, wherein the pivot shaft 51 is supported on the connecting plate 55, for example, in an integrated manner, although the pivot shaft 51 may also be supported on the connecting plate 55 and rotated together therewith, for example, in a gluing or welding manner. It will also be appreciated that the connecting plate 55 may be omitted, i.e. the pivot shaft 51 may be fixedly connected directly to the second frame part 2. As further shown in FIG. 2, the pivot mechanism also comprises a pivot mount 41, wherein one end of the pivot mount 41 is rotatably supported on the pivot shaft 51 for pivoting relative to the second frame part 2 about axis A2 of the second frame part. Further, also comprised is a pivot body 61 fixedly connected to the holding handle 3, which in this example is also configured as a pivot shaft 61. The pivot shaft 61 is pivotally supported at the other end of the pivot mount 41 about a pivot axis A3, wherein axis A2 of the second frame part is orthogonal to the pivot axis A3.

Specifically, the pivot mount 41 comprises: a counter bore at one end thereof for accommodating the pivot shaft 51, and a bearing portion (not shown) for rotatably supporting the pivot shaft 51 being disposed in the counter bore; and a pair of connecting arms 42 disposed at the other end of the pivot mount 41, wherein an interior space 421 is defined between the pair of connecting arms 42, thereby sandwiching the pivot shaft 61 in the interior space 421. The holding handle 3 may be sleeved on the pivot shaft 61 via a connecting ring such that the holding handle 3 is pivotable relative to the pivot mount 41 about the pivot axis A3. It follows that, by virtue of the above-described design, it is possible to pivot the pivot mount 43 about axis A2 of the second frame part via the pivot shaft 51 and pivot the holding handle 3 about the pivot axis A3.

As shown in FIG. 2, one end of the holding handle 3 is provided with a fixedly connected connecting ring via which the holding handle is accommodated in the interior space 421 between the pair of connecting arms 42 in such a manner that the holding handle is fixedly sleeved on the pivot shaft 61. The undesired movement of the connecting ring and the pivot shaft 61 in the direction of the pivot axis A3 can be further prevented by the clamping action on the connecting ring 31 via the pair of connecting arms 42, so that the holding handle 3 can only pivot about the pivot axis A3. In the present example, the above-mentioned pivot mount 43 may be integrally formed, for example, by injection molding, after which the pivot shaft 51 and the pivot shaft 61 are respectively inserted into the pivot mount 43 to realize the pivoting function. Thereby, adjustment of the operation postures of the Frame assembly is achieved in a simple and reliable manner.

In order to define the pivot angle range of the holding handle 3 about the pivot axis A3, preferably, also comprised is a second limiting mechanism for defining the pivot angle range of the holding handle 3, wherein as shown in FIG. 2, the second limiting mechanism comprises: a shoulder disposed at an end of the pivot shaft 61, wherein the shoulder extends on a part of the outer periphery of the pivot shaft 61 to define a limiting groove 611. As a preferred example, a plurality of threaded holes are provided on the shoulder, where by the holding handle 3 can be fixedly connected to the pivot shaft 61 by passing threading fasteners such as screws through the threaded holes and corresponding threaded holes disposed on the connecting ring. As an example, in which the limiting groove 611 is formed such that the shoulder does not extend along the overall outer periphery of the pivot body, wherein a range of a center angle corresponding to the limiting groove 611 corresponds to a range of the pivot angle of the holding handle 3, that is, both side walls of the limiting groove 611 are formed as stopping end walls when the pivot shaft 61 pivots about the pivot axis A3. Further, the second limiting mechanism also comprises a support pin 43 fixedly disposed on the connecting arm 42 as a stopper, wherein the support pin 43 extends into the limiting groove 611 defined by the shoulder so as to prevent rotation of the holding handle 3 beyond the pivot angle range thereof via fit of the support pin 43 with the stopper end walls at both ends of the limiting groove 611. By way of a non-limiting angle range, in this example, the holding handle 3 pivots within an angle range of about 120 degrees. Further, the holding handle 3 pivots within an angle range of about 90 degrees.

In a more advantageous aspect, the pivot mechanism also comprises, in the example shown in FIG. 2, a second locking mechanism for locking the holding handle 3 in a predetermined angular position, in order to enable the holding handle 3 to be maintained in a user-adjusted angular position, which comprises: a recess 612 disposed at an end portion of the pivot shaft 61, wherein the recess 612 can be formed by machining an opening on one end of the pivot shaft 61, although the recess 612 can be integrally formed when the pivot shaft 61 is injection molded; and a locking block 62 movable relative to the recess 612 in the direction of the pivot axis A3 between a pressed position and a released position, as shown in FIG. 2, wherein the locking block 62 is generally frustoconical and has an outer profile sized to frictionally engage and/or positive fit with the recess 612 when in the locked position, thereby locking the pivoting of the holding handle 3 about the pivot axis A3 via the frictional engagement and/or positive fit; and an adjustment member 63 configured to actuate the locking block 62 to act between the pressed position and the released position via its own rotation. In particular, the adjustment member is a threaded member cooperated with a threaded hole in the pivot mount 41, wherein one end of the threaded member is fixedly connected with a torque wrench disposed outside the pivot mount and the other end thereof is connected to the locking block 62. During use, the adjustment member 63 is actuated to rotate via the torque wrench disposed outside the pivot mount 41 by the user, and upon rotation of the adjustment member 63, linear movement of the adjustment member 63 in the direction of the pivot axis A3 is effected via threaded engagement with threads not shown in the pivot mount, thereby actuating the locking block 62 to act between its pressed and released positions. For frictional engagement and/or positive fit, this may be achieved by selecting the coefficient of friction of the material pair of the locking block 62 and recess 612 or by providing corresponding positive fit structure on the locking block 62 and recess 612, as is known to those skilled in the art and will not be described in detail herein.

Further, in order to avoid the influence of external dust and moisture on the pivot shaft 61, when the pivot shaft 61 is inserted in place in the pivot mount 41, also comprised is a close cover closed from the outside, for example, a cover with a clip foot which is engaged with a clip groove disposed in the connecting arm 42 of the pivot mount 41 to be fixedly connected to the pivot mount 41. Preferably, a sealing ring is provided in the close cover to improve sealing against external environmental influences.

Meanwhile, in order to define the pivot angle range of the pivot mount 41 relative to the second frame part 2, preferably, the example shown in FIG. 2 also comprises a first limiting mechanism for defining the pivot angle range of the pivot mount 41 relative to the second frame part, wherein the first limiting mechanism comprises: a limiting groove disposed in the counter bore of the pivot mount 41 and extending along the circumferential direction of the pivot shaft 52; and a stopper 52 fixedly sleeved at an end of the pivot shaft 51, wherein the stopper 52 is, for example, a collar which is in a positive fit with the pivot shaft 51 and rotates in synchronization with the pivot shaft 51, wherein the stopper 52 is provided with a stopping protrusion 521 extending into the limiting groove. Thereby, the pivot angle range of the pivot mount 41 relative to the second frame part 2 is defined by the limiting action between the stopping protrusion 521 and the two end walls of the limiting groove. As a non-limiting range of angles, in this example, the pivot mount 41 pivots within an angle range of 180 degrees. Further, the pivot mount 41 pivots within an angle range of 120 degrees.

In a more advantageous aspect, the pivot mechanism also comprises a first locking mechanism for setting the angle formed by the second frame part 2 and the pivot mount 43 (likewise, the holding handle 3) in order that the pivot mount 41 can be maintained at a user-adjusted angular position relative to the second frame part 2, wherein the first locking mechanism comprises: a clamping block 53 disposed about the pivot shaft 51 and capable of acting between a clamped position and a released position, as shown in FIG. 2, for example in the form of an open-ended dovetail, is disposed partially about the pivot shaft 51 so as to act between the released position and the clamped position under the action of an external force. Specifically, when the clamping block 53 is in the released position, the clamping block 53 is outwardly tensioned under its own tension so as not to frictionally engage the pivot shaft 51, which allows free rotation of the pivot mount 41 and the holding handle 3 relative to the second frame part 2; when the clamping block 53 is in the clamped position against its own tension under the action of the external force, the clamping block 53 prevents the pivot mount 41 from rotating about axis A2 of the second frame part via frictional engagement and/or positive-fitting with the pivot shaft 51, where by the angular position of the second frame part 2 and pivot mount 41 and holding handle 3 can be set. Further, the mechanism for applying an external force may be, for example, a threaded member 54 which may be fitted with a threaded hole disposed on the pivot mount 41, wherein one end of the threaded member 54 is fixedly connected with a knob disposed outside the pivot mount 41 for operation by a user while the other end of the threaded member 54 abuts against the clamping block. Thereby, via operation of the knob by the user, an external force can be selectively applied to the clamping block, causing it to act between the clamped position and the released position, which finally results in maintaining the pivot mount 41 in a user-adjusted angular position relative to the first member 2.

Further, FIG. 3 illustrates another exemplary mode integrating the first pivot mechanism and the second pivot mechanism together. Similar to that shown in FIG. 2, the pivot mechanism shown in FIG. 3 comprises: a connecting plate 55' fixedly connected to the second frame part. A pivot shaft 51' fixedly connected to the connecting plate 55', wherein the pivot shaft 51' is supported on the connecting plate 55' and rotates together therewith. It will also be appreciated that the connecting plate 55' may be omitted, i.e. the pivot shaft 51 may be fixedly connected directly to the second frame part 2. As further shown in FIG. 3, the pivot mechanism also comprises a pivot mount 41', wherein one end of the pivot mount 41' is rotatably supported on the pivot shaft 51' for pivoting about axis A2 of the second frame part. Further, also provided is a pivot body 61' fixedly connected to the holding handle 3, which in this example is configured as a ball joint 61'. The ball joint 61' is pivotally supported at the other end of the pivot mount 41' about the pivot axis A3, wherein axis A2 of the second frame part is orthogonal to the pivot axis A3. In this embodiment, the ball joint 61' may be a complete ball or may be a partially spherical segment or the like, as long as it is capable of being spherical contact with a corresponding clamping mount (described in more detail below).

Similar to that shown in FIG. 2, in FIG. 3, the holding handle 3 is also provided at one end thereof with a fixedly connected connecting ring via which the holding handle 3 is fixedly sleeved in the ball joint 61' and accommodated in the interior space 421' between the pair of connecting arms 42'. Undesirable movement of the connecting ring and ball joint 61' in the direction of the pivot axis A3 can be prevented by the clamping action of the pair of connecting arms 42', thereby allowing the holding handle 3 to pivot only about the pivot axis A3.

As a non-limiting example, when assembled, the connecting ring is first inserted into the interior space 421' between a pair of connecting arms, and then the ball joint 61' is placed in the connecting ring located in the interior space 421' from one side in the direction of the pivot axis A3. The outer periphery of the ball joint 61' is provided with threaded holes spaced apart by a plurality of limiting grooves 611', preferably but not limited to three threaded holes in forms of limiting grooves evenly spaced apart at 120 degrees. Accordingly, the same number of threaded holes (as shown in FIG. 3) are provided along the outer periphery of the connecting ring corresponding to the afore mentioned threaded holes, so that the connecting ring is fixedly connected to the ball joint 61' by a fastener passing through the connecting ring and the ball joint 61', thereby allowing the holding handle 3 to pivot about the pivot axis A3 via the ball joint 61'. In order to define the pivot angle range of the holding handle 3 about the pivot axis A3, preferably, the pivot mechanism also comprises a second limiting mechanism for defining the pivot angle range of the holding handle 3, wherein as shown in FIG. 3, the second limiting mechanism comprises: a limiting groove defined through the outer periphery of the ball joint 61'. Specifically, it is preferable, but not limited to, to define the limiting groove within the angle range of 120 degrees. Further, the second limiting mechanism also comprises a support pin 9' fixedly disposed at the opposite end of the pivot mount 41' as a stopper, the support pin 9' is fixedly disposed in the limiting groove 611' relative to the pivot mount 41', so that rotation of the holding handle 3 beyond the above-mentioned pivot angle range can be prevented via the support pin 9'. It should be noted that pivoting the holding handle 3 within an angle range of about 120 degrees is only an exemplary given angle range, and in this example pivoting the holding handle 3 within an angle range of about 90 degrees is also contemplated.

In a more advantageous aspect, in order to keep the holding handle 3 at a use-adjusted angle, the pivot mechanism of the example shown in FIG. 3 also comprises a second locking mechanism for locking the holding handle 3 in a predetermined angular position, as shown in FIG. 3, comprising: a pair of clamping mounts 621 and 622 as locking members respectively disposed at both sides of the ball joint 61' in the direction of the pivot axis A3, wherein the pair of clamping mounts 621 and 622 are configured to act between a pressed position and a released position in the direction of the pivot axis A3 shown in the drawings, and lock the holding handle 3 at a predetermined angular position in a frictional engagement/positive fit when the locking member is in the pressed position. Specifically, the pair of clamping mounts 621 and 622 have a spherical concave surface conformed to the outer spherical surface of the ball joint 61' to stop the ball joint' in a frictional engagement/positive fit when the pair of clamping mounts 621 and 622 are pressed. Further, the second locking mechanism also comprises an adjustment member configured to actuate the locking member to act between the pressed position and the released position via its own rotation.

Preferably, one clamping mount 622 of the pair of clamping mounts 621 and 622 is configured to be expandable upon pression. In particular, this can be achieved by providing the clamping mount 622 with a non-closed outer periphery, i.e. the clamping mount 622 has an opening. Since the clamping mount 622 is expandable, the clamping mount 622 can be further expanded to receive the ball joint 61' with a larger contact area when the ball joint 61' is pressed against the clamping mount 622, which can better lock the ball joint 61' to prevent undesired pivoting of the holding handle 3 deviated from a predetermined angular position upon external accidental action.

As shown in FIG. 3, the adjustment member comprises a threaded member 63 fitted with a threaded hole in the pivot mount 41'. Same as FIG. 2, one end of the threaded member is fixedly connected to a torque wrench disposed outside the pivot mount and the other end is connected to the locking member. The above-described screw member 63 is used in the same manner as in FIG. 2 and will not be described in detail herein.

Further preferably, the second locking mechanism shown in FIG. 3 also comprises: a guide sleeve 64 connected to the pivot mount 41' via a fastener and a wedge block 65 slidable in the guide sleeve 64, wherein one end of the wedge block 65 is connected to the threaded member 63, and the other end of the wedge block 65 is pressed against the clamping mount 621 serving as a locking member in a wedge-positive fit manner; thus, when axially guided inward in the guide sleeve 64 in the axial direction of the pivot axis A3 via the screw member 63, the screw member 63 presses the wedge 65, which in turn presses the clamping mount 621. Due to the wedge surface engagement between the wedge block 65 and the clamping mount 621, the clamping mount 621 can be wedged in its pressed position and is not easy to rebound. When the clamping mount 621 is pressed by the wedge block 65, the ball joint 61' is locked in a friction engagement/positive fit via the spherical concave surfaces of the clamping mounts 621 and 622, thereby locking the holding handle 3 at a predetermined angular position.

More preferably, as shown in FIG. 3, the wedging block 65 and the clamping mount 621 are provided with a male-female fitting structure cooperating with each other such that the wedging block 65 is not relatively rotatable relative to the clamping mount 621. By way of example, as shown in FIG. 3, wherein the male-female engagement structure on the clamping mount 663 is a rib protruding from the inclined surface of the clamping mount 621 forming a wedge-surface engagement, the male-female engagement mechanism on the wedge block 65 is a groove disposed on the inclined surface of the wedge block 65 to form an engagement with the rib.

It should be noted that, in the example shown in FIG. 3, preferably, at least one of the above ball joint 61', the pair of clamping mounts 621 and 622 and the wedge block 65 is at least partially made of a material selected from the group consisting of: nylon, aluminum alloy, steel and polyoxymethylene resin (POM). Therefore, through the material selection pairing, the friction coefficient on the contact surface between the ball joint, the pair of clamping mounts and the wedge block is increased, so that the locking mechanism works more robustly and reliably.

More preferably, in order to avoid the influence of external dust and moisture on the ball joint, also provided is a close cover 10' closed from the outside as shown in FIG. 2.

In order to define the pivot angle range of the pivot mount 41' relative to the second frame part, preferably, the pivot mechanism in the example shown in FIG. 3 also comprises a first limiting mechanism comprising: the limiting groove disposed in the counter bore of the pivot mount and extending along the circumferential direction of the pivot shaft 51'; and a stopper 71' fixedly sleeved at an end of the pivot shaft 51', wherein the stopper 71' has a stopping protrusion 721' extending into the limiting groove. Thereby, the pivot angle range of the pivot mount relative to the second frame part is defined by the limiting action between the stopping protrusion 721' and the two end walls of the limiting groove. As a non-limiting angle range, the pivot mount 41' in this example pivots within an angle range of 180 degrees relative to the second frame part 2. Further, the pivot mount 41' pivots within an angle range of 120 degrees relative to the second frame part 2.

In a more advantageous aspect, the pivot mechanism also comprises a first locking mechanism for locking the pivot mount 41' at a predetermined angular position, wherein the first locking mechanism comprises: a clamping block 53' disposed about the pivot shaft 51' and capable of acting between a clamped position and a released position, the clamping block 53' prevents rotation of the first pivot shaft 51' about the axis via frictional engagement and/or positive fit with the first pivot shaft 51', whereby the pivot mount 41' can be locked in a predetermined angular position. Further, the mechanism for applying an external force may be, for example, a threaded member 54', which may be engaged with a threaded hole on the pivot mount, wherein the threaded member is operated in the same manner as in FIG. 2, which will not be described in detail herein. Thereby, the user can selectively apply an external force to the clamping block 53' to make it act between the clamped position and the released position, which finally results in maintaining the pivot mount 41' in the user-adjusted angular position.

It should be noted that although the adjustment of the first locking mechanism, the second locking mechanism, etc. has been described above in terms of manual adjustment by the user, those skilled in the art will appreciate that, manual adjustment is merely an example, and the functions described above can likewise be implemented in an automated manner and should therefore be considered to fall within the scope of the present invention. It is further noted that the features disclosed above in the different examples are independent of each other and may be implemented individually or in any combination.

As will be apparent from the foregoing, the holding handle 3 described in the first example allows a user to lock and hold the configuration of the frame assembly according to the actual application environment, and preset the operation posture of the frame assembly, which ensure that the stabilizer is operated ergonomically, in addition to pivoting relative to the axis A2 of the second frame part and/or the pivot axis A3 so as to adjust the angle of the holding handle 3 relative to the first frame part 1 and/or the second frame part 2.

Next, a stabilizer with a second example of the Frame assembly of the present invention will be described with reference to FIGS. 4-5.

Figure 4:
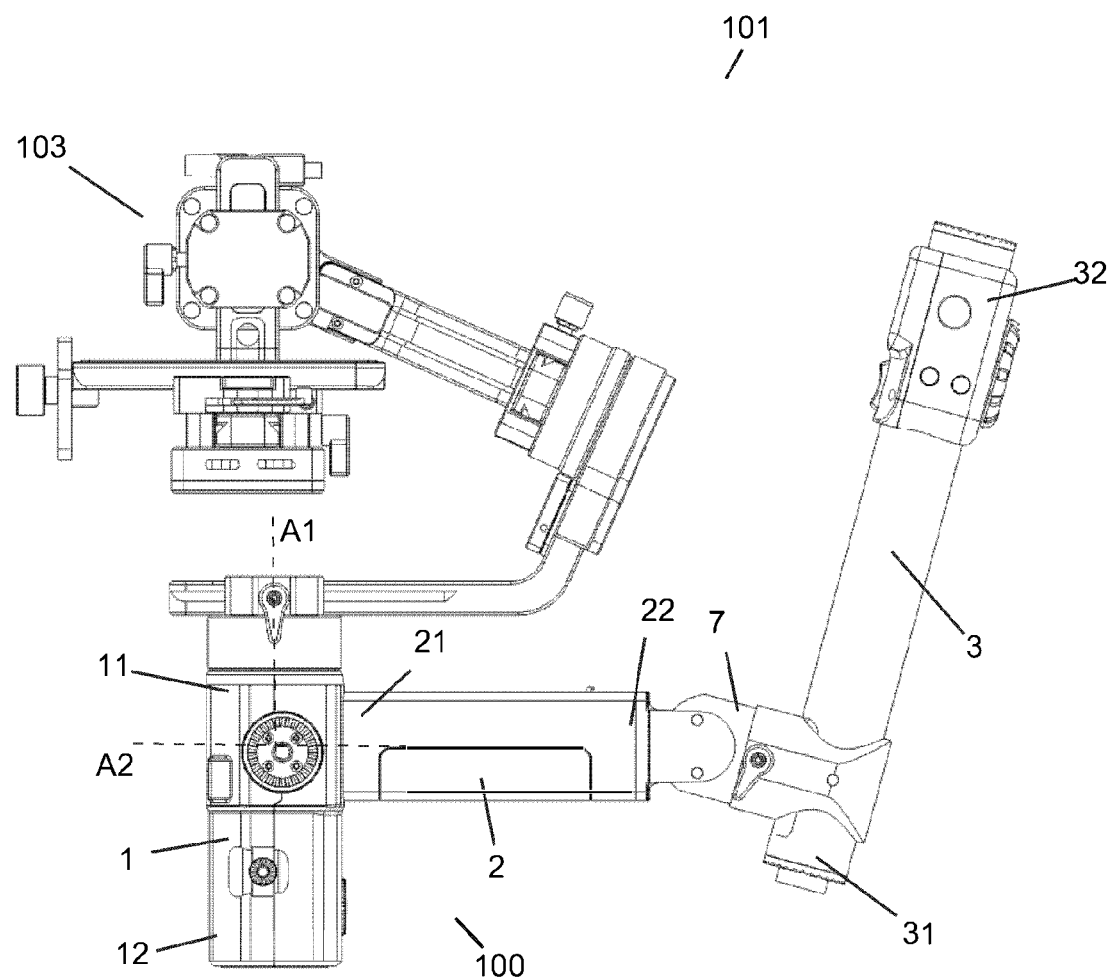
FIG. 4 shows a perspective view of a stabilizer with a second example of the frame assembly of the present invention.
Figure 5:
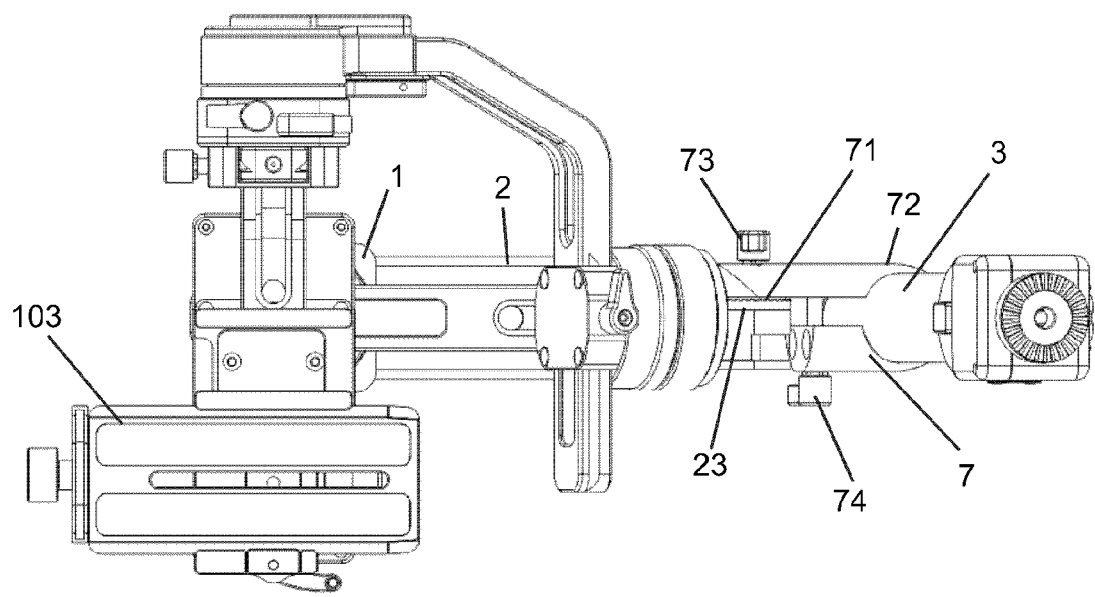
FIG. 5 shows a top view of the stabilizer according to FIG. 4.

Referring to FIGS. 4-5, a stabilizer 101 with a second example of the Frame assembly 100 of the present invention is shown. Compared to the first example, the above-described stabilizer only differs in the structure of the Frame assembly 100, and therefore the same-acting components are still shown with the same reference numerals.

The Frame assembly 100 shown in FIGS. 4-5 comprises: a first frame part 1 extending in the direction of the yaw axis A1 of the gimbal 103, the first frame part 1 being, by way of example, generally cylindrical having a first end 11 connected to the gimbal 103 and a second end 12 far away from the gimbal 103. The first frame part 1 supports the gimbal 103 with its first end 11, more specifically, the first end 11 of the first frame part 1 is connected to the yaw axis structure of the gimbal 103 so as to support the overall gimbal 103. As in the first example, the first frame part 1 is also provided at its second end 12 with a screw hole for connecting the external accessory and has its outer peripheral surface as a layout area for arranging the function keys of the stabilizer 101. With regard to the specific structure and material of the first frame part 1, it is generally the same as that of the first embodiment and will not be described in detail herein.

Further, the Frame assembly 100 also comprises a second frame part 2 extending in a direction perpendicular to the yaw axis A1 of the gimbal 103. Wherein, the second frame part 2 has a first end 21 connected to the first frame part 1 and a second end 22 far away from the first frame part 1, wherein the second frame part 2 supports the first frame part 1 at its first end 21. Preferably, the second frame part 2 is pivotally connected to the first frame part 1 about its own axis A2 relative to the first frame part 1. As an example, the two may be pivotally connected relative to each other via means such as a bearing member.

As an example, the second frame part 2 is configured as a battery compartment of the stabilizer 101 for accommodating batteries. It will be understood that relative to the specific construction and materials of the second frame part 1, it is generally the same as that of the first example and will not be described in detail herein.

As shown in FIG. 1, the Frame assembly 100 also comprises a holding handle 3 disposed at an angle relative to the second frame part 2, wherein the holding handle 3 has a connecting end 31 connected to the second frame part 2 and a holding end 32 far away from the second frame part 2, shown in FIG. 4 as being above the connecting end 31. This allows the Frame assembly to be configured to allow the stabilizer to be supported by the holding handle 3 in a manner substantially vertically aligned with the overall center of gravity of the stabilizer and the photographing device.

As a preferred example, the second end 22 of the second frame part 2 may be provided with a through-hole through which the holding handle 3 passes, wherein the holding handle 3 is accommodated in the through-hole in such a manner that its insertion depth thereof in the through-hole is adjustable. This can be achieved, for example, by varying the inner diameter of the through-hole (i.e. the tightness of the through-hole is adjustable) or by adding means for locking the insertion position of the holding handle 3 in the through-hole. Thereby, it is achieved that the holding handle 3 is fixed to the second frame part 2 in such a way that the insertion depth is adjustable in the event that the angle of the holding handle 3 relative to the second frame part 2 is not adjustable and, together with the second frame part 2, the angle of the holding handle 3 relative to the first frame part 1 is adjusted by means of pivoting between the first frame part 1 and the second frame part 2 about its own axis of the second frame part 2, thereby allowing the user to flexibly adjust the configuration of the Frame assembly according to the actual application environment to ensure that the stabilizer is ergonomically operated (variations on the configuration of the Frame assembly will be described in more detail below in connection with FIGS. 7-10).

As another preferred example, as shown in FIGS. 4-5, wherein the Frame assembly 100 may also comprise an index locking mechanism 7 disposed between the second frame part 2 and the holding handle 3, wherein the index locking mechanism is configured to be connected at one end thereof to the second end 22 of the second frame part 2. As shown in FIG. 5, the index locking mechanism 7 is also provided with an adjustment member 73 for actuating the index locking mechanism 7 to act between the engaged position and the disengaged position, preferably the adjustment member 73 is an adjustment screw. When in the disengaged position, the index locking mechanism 7 can rotate relative to the second frame part in an index adjustment manner, so that the angle formed by the second frame part 2 and the holding handle 3 can be adjusted in an index adjustment manner. Thereby, an angular adjustment between the second frame part and the holding handle can be achieved, so that the stabilizer can be operated ergonomically.

Specifically, as shown in FIGS. 4-5, the index locking mechanism 7 comprises a generally hook-shaped locking member 7 having a hook portion 72 at one end, wherein the hook portion 72 of the locking member 7 is sized to allow the holding handle 3 to pass in such a manner that the insertion depth is adjustable, as shown in FIG. 5, in which the insertion depth of the holding handle 3 is adjustable by providing a tightness adjustment member 74 for the hook portion 72, and the manner in which the adjustment member 74 adjusts the insertion depth has been described above and will not be described in detail herein. Further, the end of the locking member 7 far away from the hook portion 72 is configured with a second end face fluted disc 71 engaged with the first end face fluted disc 23 disposed at the second end 22 of the second frame part 2. The adjustment member 73 passes through the first and second end face fluted discs 23 and 71 and adjusts the interval between the first and second end face fluted disks 23 and 71, for example, in a screw feed motion. When the adjustment member 73 is unscrewed outwardly, the spacing between the first end face fluted disc 23 and the second end face fluted disc 71 becomes larger so that the locking member 7 is in the disengaged position, which allows the locking member 7 and the holding handle 3 therein to pivot relative to the second frame part 2 so as to adjust the angle formed by the second frame part 2 and the holding handle 3 in an index adjustment manner. When the adjustment member 73 is screwed inwardly, the spacing between the first and second end face fluted discs 23, 71 becomes smaller so that the locking members 7 is in the engaged position with each other, which allows the locking members 7 and the holding handles 3 therein to pivot relative to the second frame part 2 so as to maintain the adjusted angle between the second frame part 2 and the holding handles 3. Thus, it can be seen that changing the angle formed by the second frame part and the holding handle in an index adjustment manner can be accomplished via engagement of the first end face fluted disc 23 and the second end face fluted disc 71. Further, as shown in FIG. 4, the first end fluted disc 23 is pivotally connected to the second frame part 2 relative to the second frame part 2 about its axis A2, which may be achieved, for example, by causing the second end 22 of the second frame part 2 with the first end fluted disc 23 pivot relative to the axis A2 of the second frame part 2. Thereby, in the case that the angle between the holding handle 3 and the second frame part 2 is allowed to be adjustable, the angle between the holding handle 3 and the first frame part 1 is also allowed to be adjustable, which further allows the user to operate the stabilizer ergonomically.

Although the index locking mechanism is shown in FIGS. 4-5 as being formed as intermeshing end face fluted discs, it will be appreciated that the indexing lock mechanism may also be implemented as a positive fit. For example, but not by way of limitation, the index locking mechanism may be implemented by means of a manual pin and a plurality of pin holes disposed in an indexing manner on the second frame part 2, wherein the manual pin may be locked in one of the pin holes via the action of a biasing spring to effect the index adjustment. Similar structures have been clearly described above and will not be described in detail herein.

It should be noted that although the adjustment of the locking mechanism, index locking mechanism, etc. has been described above in terms of manual adjustment by a user, those skilled in the art will appreciate that, manual is merely an example, and the functions described above can likewise be implemented in an automated manner and should therefore be considered to fall within the scope of the present invention. It is further noted that the features disclosed above are independent of each other and may be implemented individually or in any combination.

The operation of the stabilizer according to the present invention in one operation posture will be described below with reference to FIG. 6.

As described above, in the prior art, in which a stabilizer of a photographing device such as a camera is installed, and due to the large mass of the camera, a problem that the overall center of gravity of the stabilizer and the photographing device may deviate from the external support point of the arm or wrist by a certain distance and cause excessive labor exists. In particular, as the professional requirements for photographing become higher and higher, the mass and size of the stabilizer with the photographing device are increasing, which further exacerbates the problem that the overall center of gravity of the stabilizer and the photographing device may deviate from the external support point of the arm or wrist by a certain distance and cause excessive labor.

Figure 6:
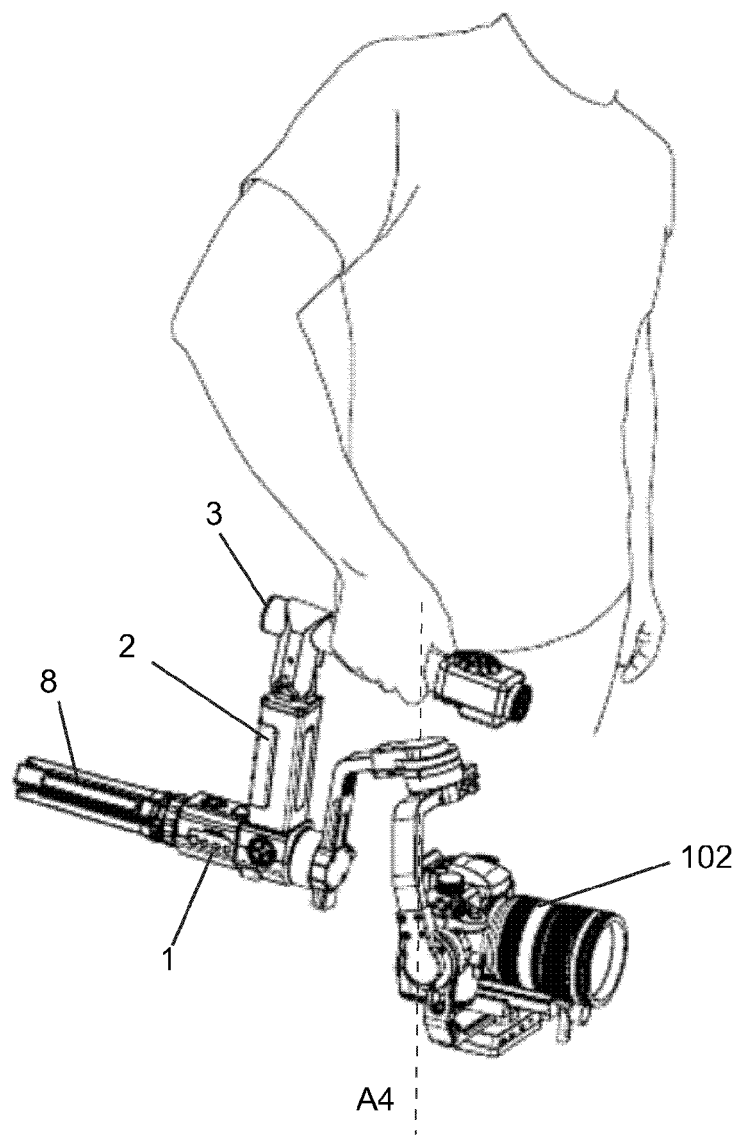
FIGS. 6-8 show views of a stabilizer according to the present invention in a hand-held state.

As shown in FIG. 6, the stabilizer according to the present invention modifies an existing straight rod frame into a multi-section Frame assembly so as to allow the holding stabilizer to be aligned substantially vertically with the overall center of gravity of the stabilizer and the photographing device via the holding handle, thereby substantially eliminating or completely eliminating the problem that the overall center of gravity of the stabilizer and the photographing device deviates from the external support point. As shown in FIG. 6, the photographing device 102, for example, a single lens reflex camera, is first mounted on the stabilizer described herein, and the operation posture of the stabilizer is described herein in low height camera tracking shots, but it will be understood that the stabilizer is not limited to operation of low height camera tracking shots.

During the low height camera tracking shots, in order to ensure a better camera viewing angle, the camera is installed as far forward as possible, which causes the overall center of gravity of the stabilizer and the photographing device (shown by the overall center of gravity line A4 of the stabilizer and the photographing device) to be further moved forward as shown in FIG. 6. If the straight rod frame in the prior art is used, the distance between the outer support point and the overall center of gravity line A4 is increased. With the stabilizer herein, it is possible to first lay the stabilizer flat in a position such that the first frame part 1 lies substantially parallel at a height from the ground, in which case the second frame part 2 is oriented substantially vertically and the holding handle 3 is oriented roughly transversely. At this time, the insertion depth of the holding handle 3 relative to the second frame part 2 can be adjusted accordingly to ensure that the holding end of the holding handle 3 extends beyond the overall center of gravity line A4, depending on the forward movement of the overall center of gravity line A4 of the stabilizer. At this time, the user can hold the stabilizer in such a manner that the grip portion on the holding handle 3 is substantially collinear with the overall center of gravity line A4 (i.e., hold the stabilizer in a manner substantially vertically aligned with the overall center of gravity of the stabilizer and the photographing device) after several trial grips. After determining the proper position of the grip portion on the holding handle 3, the user can straighten the arm so that the arm, the wrist, and the overall center of gravity line A4 of the stabilizer and the photographing device are aligned. Under the condition, due to the fact that the distances among the overall center of gravity of the stabilizer and the photographing device and the arm and the wrist generally do not exist, the user can hold the stabilizer 3 for photographing in a labor-saving manner, greatly improving the ergonomic friendliness of the stabilizer, and improving the user experience.

Further, various operation postures of the stabilizer herein are further described in conjunction with FIGS. 7-11.

Figure 7:
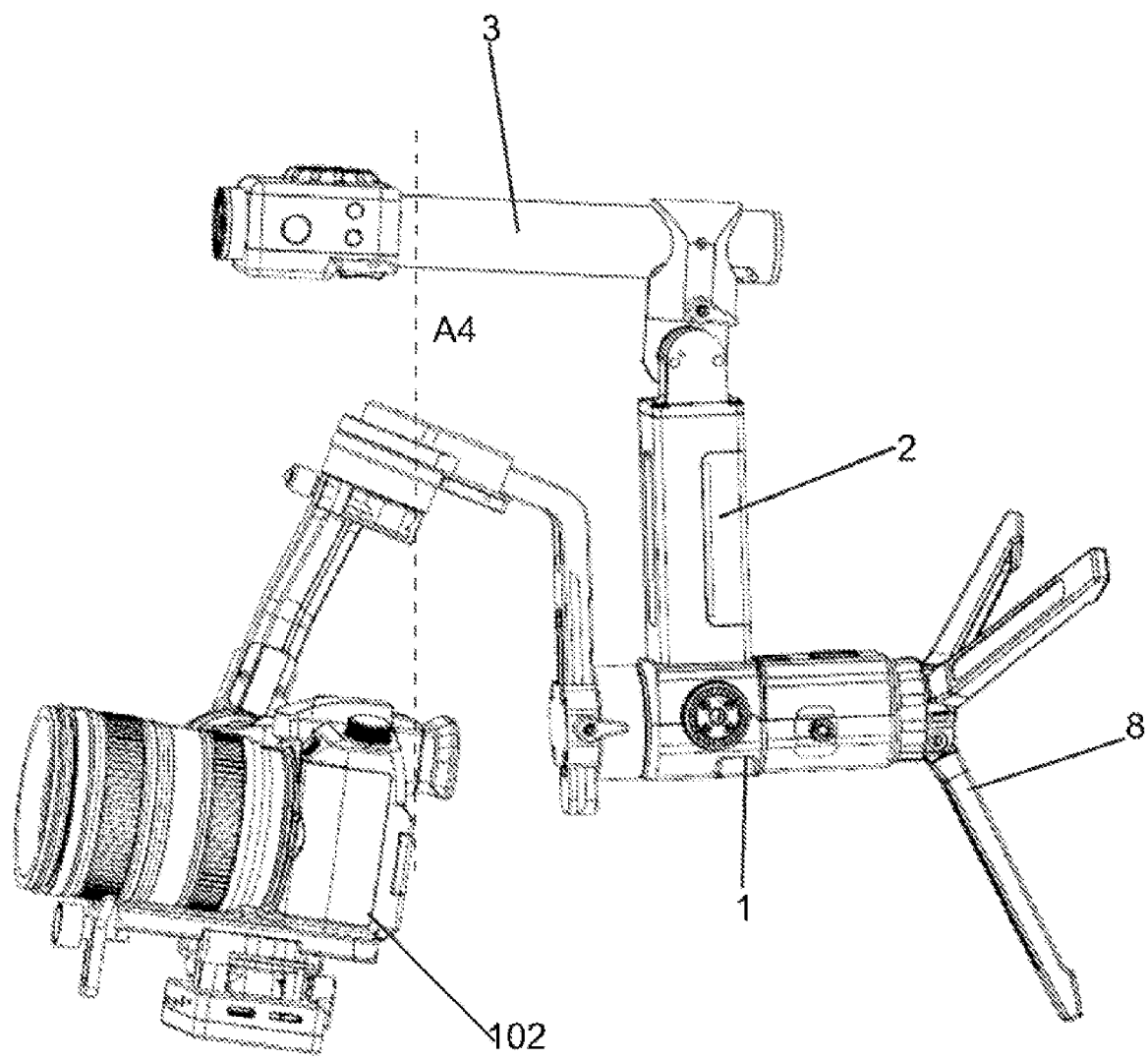
Figure 8:
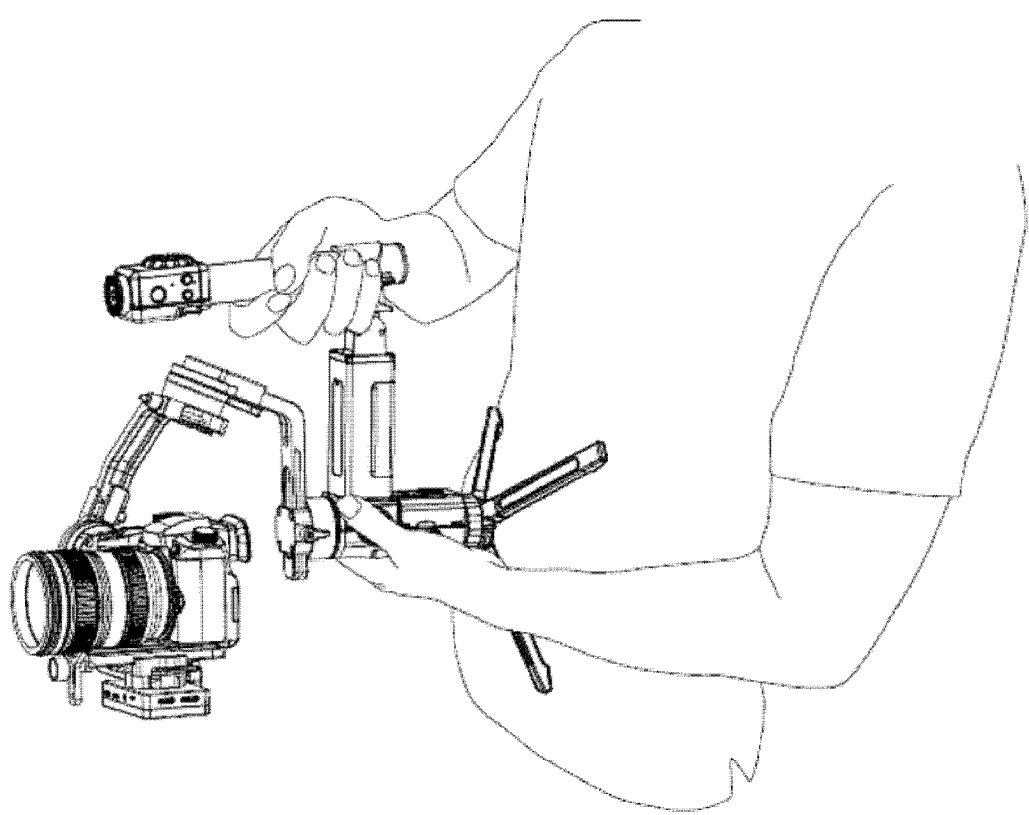

FIGS. 7-8 show another operation posture of the stabilizer, which is preferably suitable for median height camera tracking shots. Under this operation posture, an external accessory, such as a tripod, connected to the second end 12 of the first frame part 1 is opened and the stabilizer is laid flat in a position such that the first frame part 1 lies roughly parallel at a height from the ground. At this time, the user determines the most appropriate grip position on the holding handle 3 according to the approximate positions of the overall center of gravity line of the stabilizer and the photographing device in trial grips manner as well. Furthermore, the tripod 8 in the opened state is abutted against the body of the user, so that on the one hand, undesired shaking of the stabilizer during operation is eliminated by the body; on the other hand, it is also possible to partially support the weight of the stabilizer via the frictional force of the body with the tripod 8. At the same time, the user can also drag the first frame part 1 of the Frame assembly from below via his other hand to further support the weight of the stabilizer. And in this operation state, the other hand of the user can conveniently operate the function keys arranged on the first frame part 1. Therefore, this operation posture also has good ergonomic friendliness, facilitating the improvement of user experience.

Figure 9:
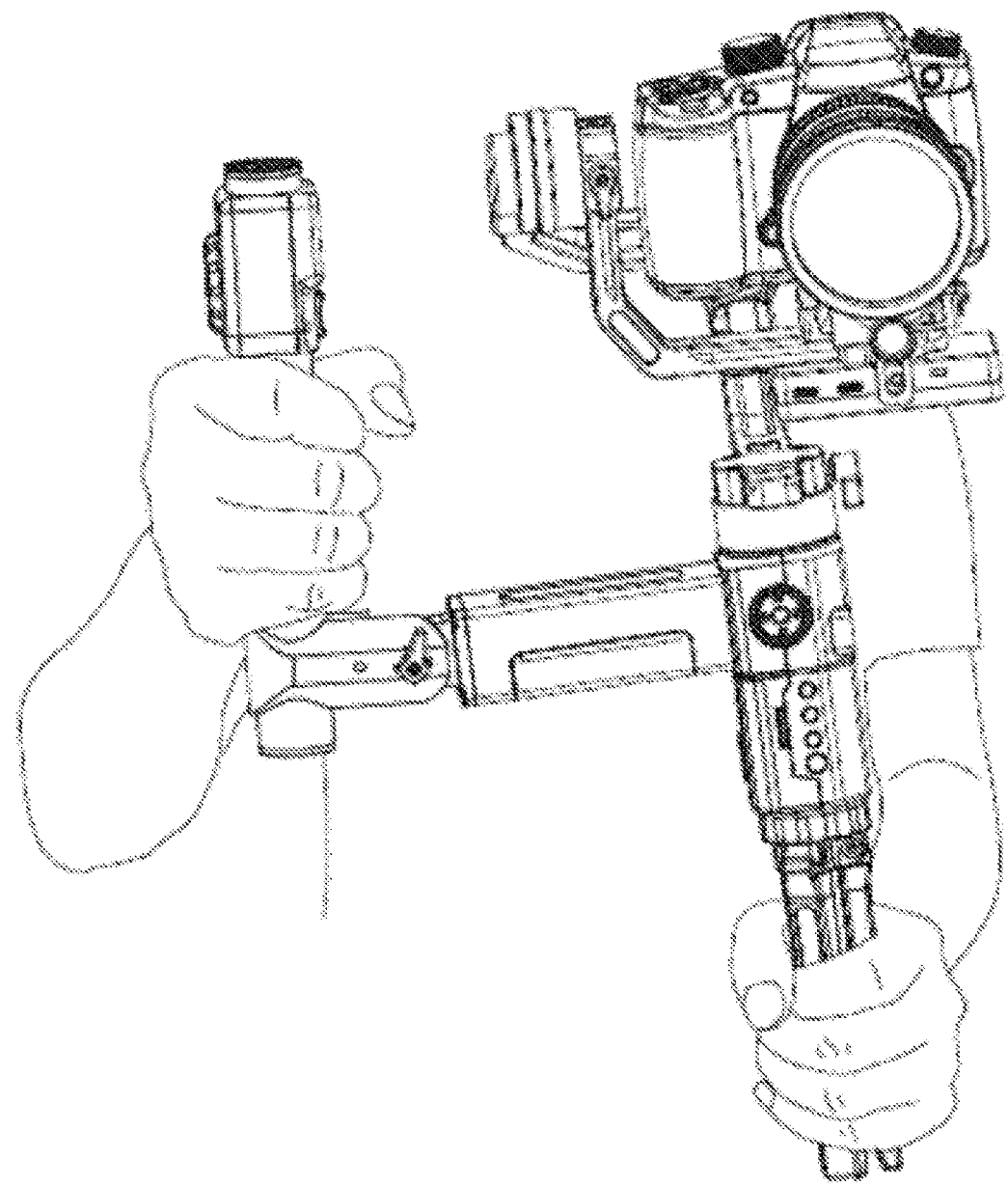
FIGS. 9-11 show views of the stabilizer according to the present invention in other use configurations.

FIG. 9 shows an another yet operation posture of the stabilizer, which is preferably suitable for median-high height camera tracking shots. Under this operation posture, an external accessory, such as a tripod, connected to the second end 12 of the first frame part 1 is closed and the stabilizer is placed in a place generally vertically at a height from the ground. At this time, since the overall center of gravity of the stabilizer and the photographing device is roughly in the vertical direction, the stabilizer can be held in a labor-saving manner by gripping the external accessory. Meanwhile, preferably, the holding handle may be pivoted to a position generally parallel to the first frame part, thereby allowing the other hand of the user to perform an auxiliary grip from the right side thereof. In this use configuration, the other hand of the user can conveniently operate the function keys arranged on the holding handle 3. Therefore, this operation posture also has good ergonomic friendliness, facilitating the improvement of user experience.

Figure 10:
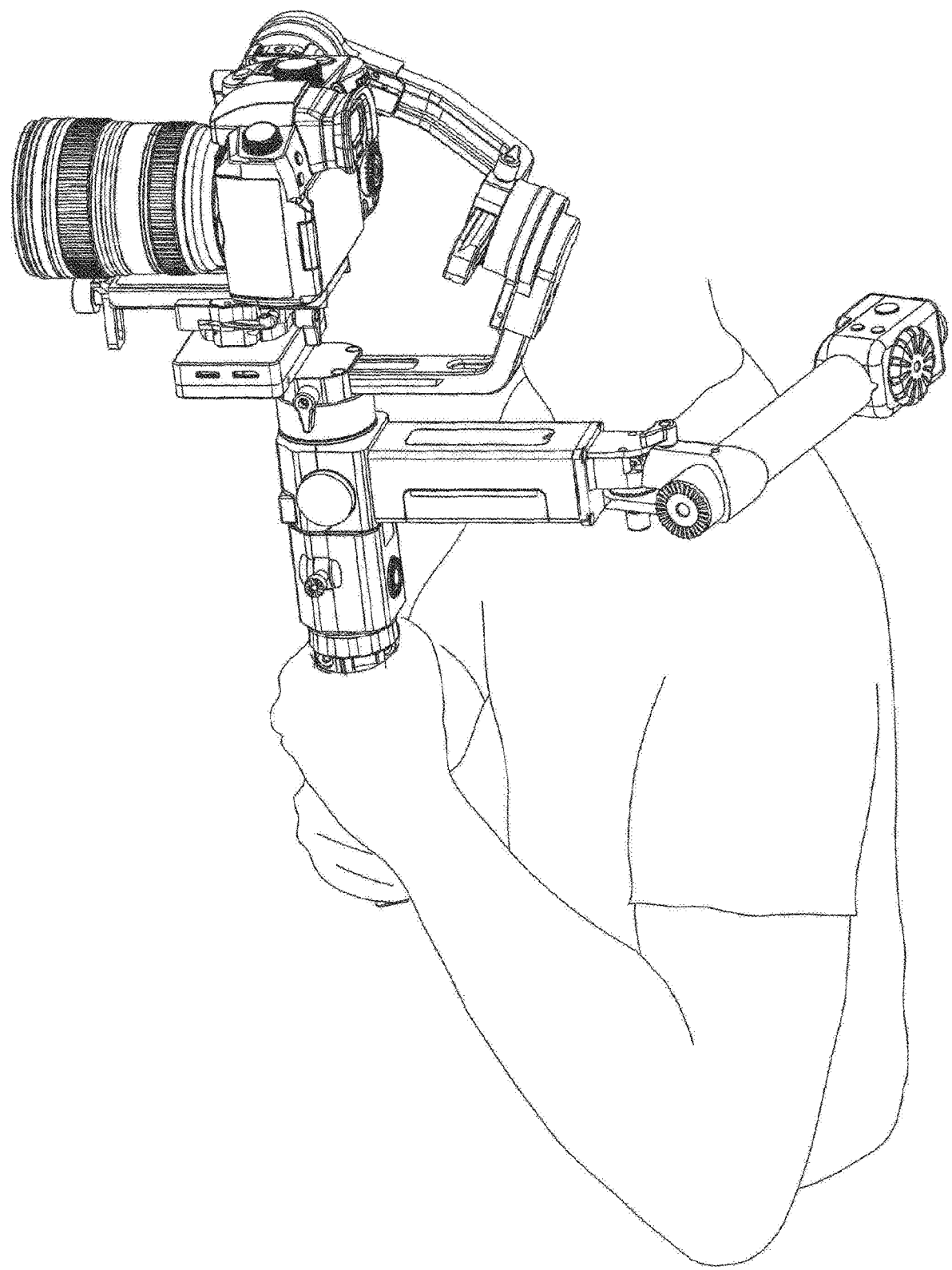

FIG. 10 shows a still yet another operation posture of the stabilizer, which is preferably suitable for high height camera tracking shots. Under this operation posture, an external accessory, such as a tripod, connected to the second end 12 of the first frame part 1 is closed and the stabilizer is placed in a place generally vertically at a height from the ground. At this time, since the overall center of gravity of the stabilizer and the photographing device is roughly in the vertical direction, the stabilizer can be held in a labor-saving manner by gripping the external accessory. Meanwhile, as shown in FIG. 10, the holding handle 3 may be pivoted to a position generally orthogonal to the first frame part 1, thereby allowing a user to place the second frame part on the user's shoulder and support the stabilizer using his shoulder. It follows that, in this use configuration, it is possible to allow the user to support the stabilizer in a very labor-saving manner, which is advantageous for improving the user experience.

Figure 11:
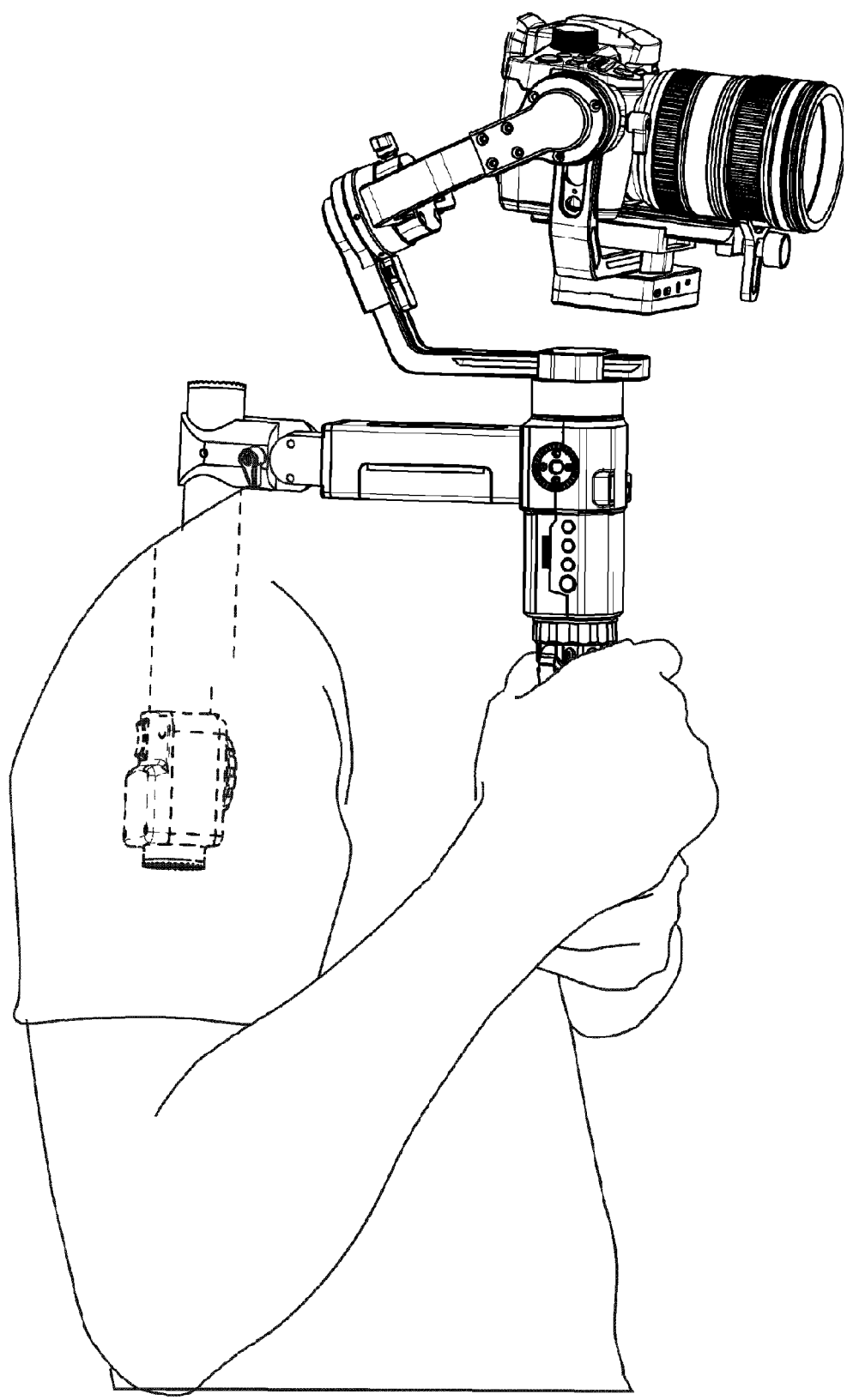

As a modification of this operation posture, the holding handle may be pivoted to a position shown in FIG. 11 generally parallel to and partially coincident with the first frame part during the high height camera tracking shots, so that the Frame assembly as a whole is roughly in the shape of "⌒", that is, the second frame part 2 is located in the middle, and the holding handle 3 and the first frame part 1 are respectively positioned at two ends of the second frame part 2 in a parallel and partially overlapped manner. This allows the user to support the stabilizer in the form of clamping shoulder, which not only support the stabilizer very labor-effectively, but also prevents accidental tilting or slipping of the stabilizer during operation. Therefore, this operation posture also has good ergonomic friendliness, facilitating the improvement of user experience.

It should be understood that although this specification is described in accordance with various embodiments, not each embodiment only contains an independent technical solution. This narration in the specification is only for clarity, and those skilled in the art should regard the specification as a whole the technical solutions in the various embodiments can also be combined to form other implementations that can be understood by those skilled in the art.

The foregoing description is of illustrative embodiments of the present invention and is not intended to limit the scope of the present invention. Equivalent changes, modifications and combinations will occur to those skilled in the art without departing from the spirit and scope of the present invention.

The invention claimed is:

1. A Frame assembly for a stabilizer, wherein the stabilizer comprises a gimbal for fixing a photographing device and adjusting the posture of the photographing device, and the frame assembly is used for supporting the gimbal, characterized in that, the frame assembly comprises: a first frame part having a first end connected to the gimbal and a second end far away from the gimbal, the first frame part being configured to support the gimbal with its first end; a second frame part having a first end connected to the first frame part and a second end far away from the first frame part, the second frame part being configured to be disposed at an angle with the first frame part; and a holding handle configured with a connection end connected to the second end of the second frame part and a holding end far away from the second frame part such that the frame assembly is configured to allow the stabilizer to be held via the holding handle in a manner substantially vertically aligned with an overall center of gravity of the stabilizer and a photographing device;

where the frame assembly, characterized in that:
the gimbal is a three-axis gimbal having a yaw axis, wherein the first frame part extends generally in the direction of the yaw axis and the second frame part extends substantially perpendicular to the yaw axis;
the first frame part and the second frame part are constructed as one piece,
the holding handle is pivotally connected to the second end of the second frame part about an axis of the second frame part via a first pivot mechanism disposed between the holding handle and the second frame part such that an angle of the holding handle relative to the first frame part is adjustable,
the first pivot mechanism comprises: a pivot shaft fixedly connected to the second frame part; and a pivot mount, one end of which is rotatably supported on the pivot shaft to pivot relative to the second frame part about the axis of the second frame part, and the opposite end of which is connected to the holding handle,
the first pivot mechanism further comprises a first limiting mechanism configured to define a pivot angle range of the pivot mount relative to the second frame part about the axis of the second frame part and comprising: a limiting groove disposed on the pivot mount and extending along the circumferential direction of the pivot shaft a stopper fixedly connected to an end portion of the pivot shaft, the stopper having a stopping protrusion extending into the limiting groove, and the first pivot mechanism also comprises a first locking mechanism configured to lock the pivot mount in a predetermined angular position relative to the second frame part and comprising: a clamping block disposed about the pivot shaft and capable of acting between a clamped position and a released position, and when the clamping block is in the clamped position, the clamping block prevents the pivot mount from rotating relative to the second frame part about the pivot shaft via frictional engagement and/or positive fit between the clamping block and the pivot shaft a threaded member configured to actuate the clamping block to act between the clamped position and the released position via its own rotation.

2. The Frame assembly of claim 1, characterized in that, the holding handle is pivotally connected to the second end of the second frame part about a pivot axis orthogonal to an axis of the second frame part via a second pivot mechanism disposed between the holding handle and the second frame part such that an angle of the holding handle relative to the second frame part is adjustable.

3. The Frame assembly of claim 2, characterized in that, the second pivot mechanism comprises: a pivot mount, one end of which is connected to the second frame part, and the other end of which is provided with a pair of connecting arms, and an interior space is defined between the pair of connecting arms; a pivot body fixedly connected to the holding handle, the pivot body being configured to be sandwiched in the interior space between the pair of connecting arms such that the holding handle is pivotable about the pivot axis relative to the pivot mount.

4. The Frame assembly of claim 3, characterized in that, the second pivot mechanism further comprises a second limiting mechanism configured to define a pivot angle range of the holding handle relative to the second frame part and comprising: a limiting groove defined at least in part by the pivot body, the limiting groove being configured to rotate with the holding handle and define an angle range at which the holding handle is pivotable; and a stopper fixedly disposed on the pivot mount and extending into the limiting groove so as to prevent the holding handle from rotating beyond the angle range via the stopper.

5. The Frame assembly of claim 3, characterized in that, the second pivot mechanism further comprises a second locking mechanism configured to lock the holding handle in a predetermined angular position relative to the second frame part, comprising: a locking member configured to act between a pressed position and a released position in the direction of the pivot axis, wherein the locking member is configured to lock the holding handle at a predetermined angular position relative to the second frame part via frictional engagement and/or positive fit when being in the pressed position; and an adjustment member configured to actuate the locking member to act between the pressed position and the released position via rotation thereof.

6. The Frame assembly according to claim 5, characterized in that, the pivot body is a ball joint, and the locking member comprises a pair of clamping mounts respectively disposed at both sides of the ball joint in the direction of the pivot axis, wherein the pair of clamping mounts have a spherical concave surface conforming to an outer spherical surface of the ball joint to stop the ball joint via frictional engagement and/or positive fit when the clamping mounts are pressed.

7. The Frame assembly according to claim 5, characterized in that, the pivot body is a pivot shaft, and the locking member comprises a locking block located at one side of the pivot shaft in the direction of the pivot axis, the locking block being conformed to a recess disposed at an end side of the pivot shaft to stop the pivot shaft via frictional engagement and/or positive fit when the locking block is pressed.

8. The Frame assembly of claim 5, characterized in that, the second locking mechanism further comprises a guide sleeve fixedly connected to the pivot mount; and a wedge block slidable within the guide sleeve, the wedge block being arranged between the adjustment member and the locking member and configured to wedge the locking member in its pressed position via a wedge surface fit with the locking member when being pressed.

9. The Frame assembly of claim 2, characterized in that, the second pivot mechanism is configured as an index locking mechanism configured to be connected at one end thereof to the second end of the second frame part, the index locking mechanism is also provided with an adjustment member for actuating the index locking mechanism to act between an engaged position and a disengaged position, when in the disengaged position, the index locking mechanism can rotate relative to the second frame part in an index adjustment manner, so that the angle formed by the holding handle relative to the second frame part can be adjusted in an index adjustment manner.

10. The Frame assembly of claim 9, characterized in that, the index locking mechanism comprises a generally hook-shaped locking member having a hook portion at one end; the hook portion of the locking member is sized for the holding handle to be passed in such a manner that the insertion depth is adjustable, an end of the locking member far away from the hook portion is configured with a second end face fluted disc meshed with a first end face fluted disc at the second end of the second frame part, and the angle of the holding handle relative to the second frame part is adjusted in an index adjustment manner through meshing of the first end face fluted disc and the second end face fluted disc.

11. The Frame assembly of claim 1, characterized in that, a through-hole is provided at the second end of the second frame part through which the holding handle passes, and the holding handle is accommodated in the through-hole in such a manner that its insertion depth in the through-hole is adjustable.

12. The Frame assembly of claim 1, characterized in that, the second frame part is pivotally connected to the first frame part about its own axis relative to the first frame part.

13. The Frame assembly of claim 1, characterized in that, the first frame part is provided with a screw hole for connecting an external accessory at its second end, or the holding handle is provided with a screw hole for connecting an external accessory at its connecting end or holding end.

14. A stabilizer comprises a gimbal for fixing a photographing device and adjusting a posture of the photographing device and a Frame assembly for supporting the gimbal, wherein the Frame assembly is the Frame assembly of claim 1.

* * * * *